United States Patent
Phillips et al.

(10) Patent No.: US 11,390,300 B2
(45) Date of Patent: Jul. 19, 2022

(54) METHOD FOR USING LATERAL MOTION TO OPTIMIZE TRAJECTORIES FOR AUTONOMOUS VEHICLES

(71) Applicant: UATC, LLC, San Francisco, CA (US)

(72) Inventors: Michael Lee Phillips, Pittsburgh, PA (US); David McAllister Bradley, Pittsburgh, PA (US); Utku Eren, Pittsburgh, PA (US); Chenggang Liu, Pittsburgh, PA (US); Daoyuan Jia, Pittsburgh, PA (US); Eric Michael Perko, Pittsburgh, PA (US); Samuel Philip Marden, Pittsburgh, PA (US); Kalin Vasilev Gochev, Pittsburgh, PA (US); Moslem Kazemi, Allison Park, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/014,168

(22) Filed: Sep. 8, 2020

(65) Prior Publication Data
US 2021/0114617 A1  Apr. 22, 2021

Related U.S. Application Data

(60) Provisional application No. 62/923,210, filed on Oct. 18, 2019.

(51) Int. Cl.
*B60W 60/00* (2020.01)
*B60W 40/10* (2012.01)
(Continued)

(52) U.S. Cl.
CPC .... *B60W 60/0011* (2020.02); *B60W 30/0953* (2013.01); *B60W 30/0956* (2013.01); *B60W 40/10* (2013.01); *G01C 21/3453* (2013.01)

(58) Field of Classification Search
CPC . G05D 1/0214; G05D 1/0212; B60W 30/095; B60W 30/0956; B60W 30/0953;
(Continued)

(56) References Cited

U.S. PATENT DOCUMENTS 9,120,484 B1   9/2015  Ferguson et al.
10,671,076 B1 * 6/2020  Kobilarov ............ G05D 1/0255
(Continued)

FOREIGN PATENT DOCUMENTS

EP   2945140   11/2015

OTHER PUBLICATIONS

Alesiani, et al., "Locally Growing Rapid Tree (LGRT) Motion Planning for Autonomous Driving", 2016 IEEE 19th International Conference on Intelligent Transportation Systems (ITSC), Nov. 1, 2016, retrieved on Dec. 22, 2016, pp. 1120-1125.

*Primary Examiner* — Ryan Rink
(74) *Attorney, Agent, or Firm* — Dority & Manning, P.A.

(57) ABSTRACT

The present disclosure is directed generating candidate trajectories and selecting one of them to be implemented. In particular, a computing system can obtain an initial travel path for an autonomous vehicle. The computing system can obtain sensor data describing objects within an environment of the autonomous vehicle. The computing system can generate a plurality of trajectories for the autonomous vehicle based on the sensor data and the initial travel path. The computing system can determine whether the initial travel path, an offset profile, and a velocity profile meet flatness criteria. In response to determining that the initial travel path, the offset profile, and the velocity profile meet the flatness criteria, the computing system can combine the initial travel path, the offset profile, and the velocity profile into the respective trajectory. The computing system can determine a trajectory from the plurality of trajectories.

21 Claims, 13 Drawing Sheets

(51) Int. Cl.
*B60W 30/095* (2012.01)
*G01C 21/34* (2006.01)

(58) Field of Classification Search
CPC .. B60W 30/08; G01C 21/343; G01C 21/3453
See application file for complete search history.

(56) References Cited

U.S. PATENT DOCUMENTS

| | | | | |
|---|---|---|---|---|
| 2014/0185880 A1* | 7/2014 | Fairfield | ............ | G06K 9/00825 |
| | | | | 382/104 |
| 2014/0244151 A1* | 8/2014 | Matsubara | .......... | B60W 30/095 |
| | | | | 701/301 |
| 2015/0073663 A1 | 3/2015 | Nilsson et al. | | |
| 2015/0153735 A1* | 6/2015 | Clarke | .................. | G06T 7/285 |
| | | | | 701/301 |
| 2015/0248131 A1* | 9/2015 | Fairfield | ............... | B60W 30/00 |
| | | | | 701/2 |
| 2016/0375901 A1* | 12/2016 | Di Cairano | ........ | G01C 21/3453 |
| | | | | 701/26 |
| 2019/0204842 A1* | 7/2019 | Jafari Tafti | .............. | G06N 3/04 |
| 2019/0317508 A1* | 10/2019 | Zhang | ............. | G08G 1/096844 |
| 2019/0389459 A1* | 12/2019 | Berntorp | ............. | G08G 1/167 |
| 2020/0132488 A1* | 4/2020 | Slutskyy | ............ | B60W 60/0011 |
| 2020/0139959 A1* | 5/2020 | Akella | ................. | G05D 1/0214 |
| 2020/0331476 A1* | 10/2020 | Chen | .................... | G05D 1/0088 |
| 2020/0377085 A1* | 12/2020 | Floyd-Jones | ... | B60W 60/00276 |
| 2021/0094540 A1* | 4/2021 | Bagschik | .......... | G06K 9/00791 |
| 2021/0162994 A1* | 6/2021 | Shalev-Shwartz | .... | B60W 10/06 |
| 2021/0271245 A1* | 9/2021 | Bradley | ............... | G05D 1/0088 |
| 2021/0316763 A1* | 10/2021 | Domahidi | ........... | B62D 15/027 |

* cited by examiner

METHOD FOR USING LATERAL MOTION TO OPTIMIZE TRAJECTORIES FOR AUTONOMOUS VEHICLES

RELATED APPLICATION

The present application is based on and claims benefit of U.S. Provisional Patent Application No. 62/923,210 having a filing date of Nov. 18, 2019, which is incorporated by reference herein.

FIELD

The present disclosure relates generally to autonomous vehicles. More particularly, the present disclosure relates to planning trajectories in an autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system comprising one or more computing devices, an initial travel path for an autonomous vehicle from a first location to a second location. The method can include obtaining, by the computing system, sensor data describing one or more objects within an environment of the autonomous vehicle, wherein the one or more objects are positioned along the initial travel path. The method can include generating, by the computing system, a plurality of trajectories for the autonomous vehicle based, at least in part, on the sensor data and the initial travel path. The method can include, as part of generating a respective trajectory, determining, by the computing system, a velocity profile for the autonomous vehicle, and determining, by the computing system, an offset profile for the autonomous vehicle wherein the offset profile includes a plurality of lateral offset values, each lateral offset value represents a direction and distance of offset from the initial travel path at a point along the initial travel path. The method can include determining, by the computing system, whether the initial travel path, the offset profile, and a velocity profile each meet one or more flatness criteria. The method can include, in response to determining that the initial travel path, the offset profile, and the velocity profile each meet the one or more flatness criteria, combining, by the computing system, the initial travel path, the offset profile, and the velocity profile into the respective trajectory. The method can include determining, by the computing system, a trajectory from the plurality of trajectories. The method can include controlling, by the computing system, motion of the autonomous vehicle based, at least in part, on the trajectory.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
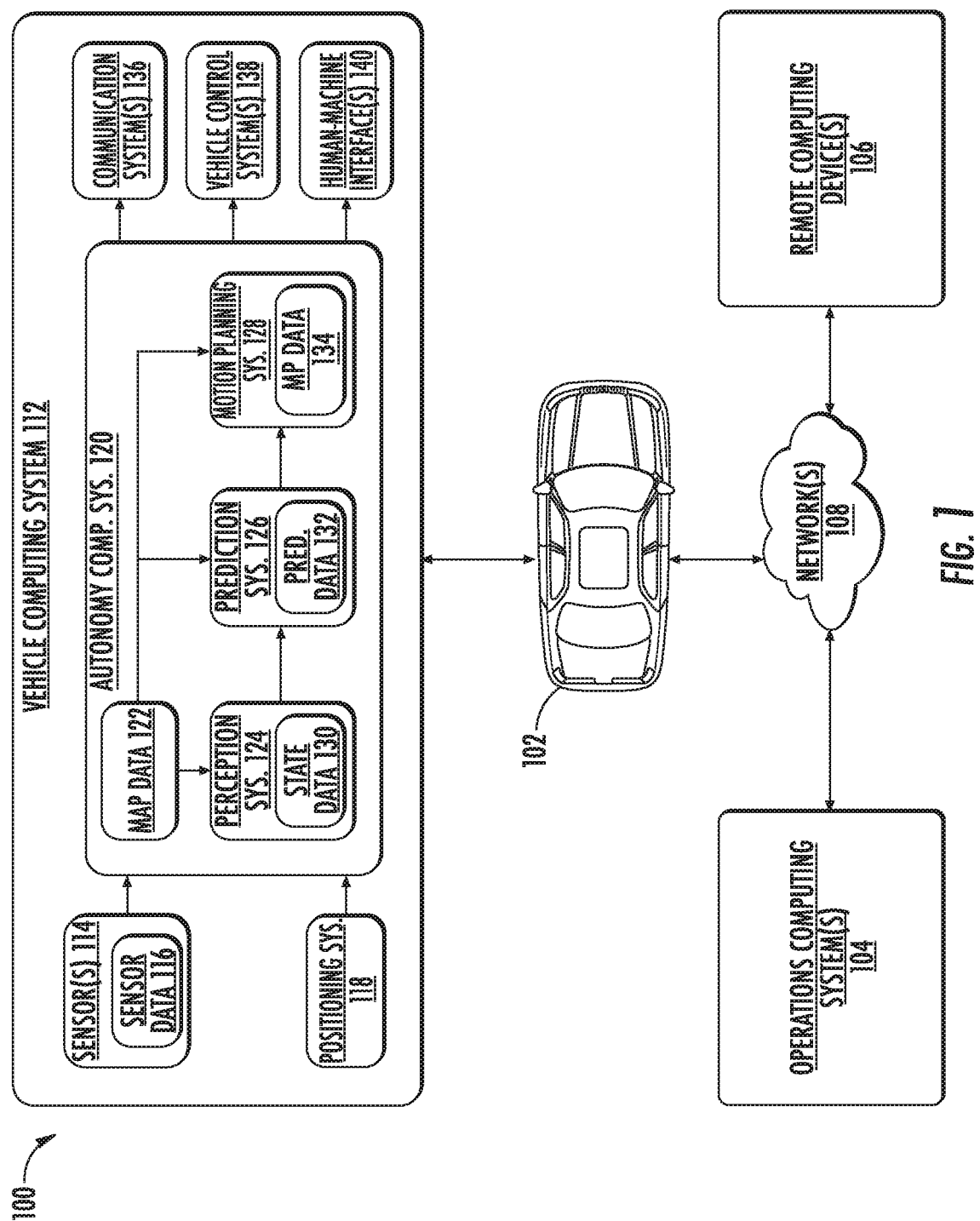
FIG. 1 depicts a block diagram of an example autonomous vehicle according to example embodiments of the present disclosure.

Generally, the present disclosure is directed to an improved motion planning framework for generating a trajectory that can be used to direct an autonomous vehicle from a first position to a second position. More specifically, the framework can be utilized for generating executable autonomous vehicle motion trajectories that aim to improve safety and comfort (e.g., reducing a possibility of a collision and minimizing acceleration, jerk, etc.). For example, the onboard computing system of an autonomous vehicle (e.g., a vehicle computing system) can obtain an initial travel path describing a path for the autonomous vehicle to travel from the first position to the second position. The initial travel path can include a nominal path within lane boundaries and/or other reference points within the autonomous vehicle's environment. The vehicle computing system can access sensor data that is descriptive of the environment surrounding the autonomous vehicle. For example, the sensor data can include data representing one or more objects (e.g., stationary or moving obstacles along the initial travel path). The vehicle computing system can utilize this data to detect and classify the objects as well as predict any future movement of the objects. The vehicle computing system (e.g., a motion planner) can generate a plurality of candidate trajectories for the autonomous vehicle. Each trajectory can be executable by the autonomous vehicle. For example, each trajectory can be dynamically feasible such that it can be implemented by a vehicle controller/control system. Each trajectory can include a velocity profile and an offset profile. The velocity profile can describe one or more acceleration values and associated timing information. The offset profile can include a plurality of offset values, each offset value representing an amount and direction of lateral offset from the initial travel path. The offset profile can indicate a lateral movement for the autonomous vehicle that would allow it to avoid an object (e.g., within a lane, using a partial lane departure, etc.). As such, a lateral offset profile can increase the number of candidate trajectories to be considered by the autonomous vehicle and allow for more efficient vehicle movement.

The vehicle computing system can determine, for each respective candidate trajectory, a cost associated with the respective candidate trajectory (e.g., based on collision avoidance, maintaining lane position, gentle acceleration, etc.). The vehicle computing system can select the candidate trajectory with the lowest determined cost.

Some vehicle computing systems may not include the ability to use a flat sampling system. If so, the vehicle computing system may include an optimizer to alter the selected candidate trajectory to smooth the autonomous vehicle's overall motion. Smoothing the trajectory can include altering the selected trajectory to reduce any acceleration and/or jerk values that exceed a threshold. Smoothing can include generating a plurality of potential smoothed paths that can be scored using the same costing functions that were used originally to select a particular trajectory from the plurality of candidate trajectories. In some examples, the system can generate a corridor or tube in which the optimizer can modify the selected trajectory based on smoothness considerations. However, the corridor can be supplied to the overall path planner to pad the area of the tube (or corridor) to ensure that no obstacles or other actors enter into the tube and render it unsafe.

Once a candidate trajectory has been selected and optimized, the data associated with the trajectory can be communicated to a vehicle controller. The controller can cause the autonomous vehicle to move in accordance with the trajectory, thereby implementing the trajectory's velocity and offset profiles to efficiently maintain vehicle speed with gentle acceleration, while avoiding any objects within the vehicle's environment.

The systems and methods of the present disclosure provide improved techniques for generating and evaluating trajectories for autonomous vehicles. More particularly, an autonomous vehicle can periodically generate or update their existing trajectories to consider current environmental factors (e.g., objects in the current environment, updated directions from a controller, and so on) and plan specific driving controls that allow the autonomous vehicle to navigate safely from one position to another. As further described herein, the present technology allows an autonomous vehicle to more efficiently control its motion along an initial travel path (e.g., a nominal path), with a lateral offset from the initial travel path (e.g., via the offset profile) as a function of time. Ultimately, the vehicle control system can improve the autonomy capability of an autonomous vehicle to more safely navigate through its environment (without getting stuck or requiring human intervention). Additionally, this technology can increase the efficiency of an autonomous vehicle's motion by improving the vehicle's ability to autonomously maintain its speed while avoiding objects and reducing potential traffic disruption.

More particularly, an autonomous vehicle can include a vehicle computing system. The vehicle computing system can be responsible for, among other functions, creating the control signals needed to effectively control an autonomous vehicle. The vehicle computing system can include an autonomy computing system. The autonomy computing system can include one or more systems that enable the autonomous vehicle to plan a route, receive sensor data about the environment, perceive objects within the vehicle's surrounding environment (e.g., other vehicles), predict the motion of the objects within the surrounding environment, generate trajectories based on the sensor data, and perception/predicted motion of the objects, and, based on the trajectory, transmit control signals to a vehicle control system and thereby enable the autonomous vehicle to move to its target destination. To accomplish these operations, the autonomy computing system can include, for example, a perception system, a prediction system, and a motion planning system.

To help maintain awareness of the vehicle's surrounding environment, the vehicle computing system (e.g., the perception system) can access sensor data from one or more sensors to identify static objects and/or dynamic objects (actors) in the autonomous vehicle's environment. To help determine its position within the environment (and relative to these objects), the vehicle computing system can use a positioning system and/or a communication system to determine its current location. Based on this location information, the vehicle computing system can access map data (e.g., HD map data, etc.) to determine the autonomous vehicle's current position relative to other objects in the world (e.g., bicycles, pedestrians, other vehicles, buildings, etc.), as well as map features such as, for example, lane boundaries, curbs, and so on.

The vehicle computing system (e.g., the perception system) can utilize the sensor data to identify one or more objects in the local environment of the autonomous vehicle. The sensor data can include, but is not limited to, data acquired via camera sensors, LIDAR sensors, and RADAR sensors. Using this sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system (e.g., the prediction system) can use the perception data to generate predictions for the movement of one or more objects as an object trajectory including one or more future coordinates/points. In some implementations, the perception and prediction functions of the vehicle computing system can be included within the same system.

The vehicle computing system (e.g., motion planning system) can use the perception data, prediction data, map data, and/or other data to generate a motion plan for the vehicle. For example, a route can describe a specific path for the autonomous vehicle to travel from a current location to a destination location. The vehicle computing system can generate candidate trajectories for the autonomous vehicle to follow as it traverses the route. Each candidate trajectory can be executable by the autonomous vehicle (e.g., feasible for the vehicle control systems to implement). Each trajectory can be generated to comprise a specific amount of travel time (e.g., eight seconds, etc.).

The autonomous vehicle can select and implement a trajectory for the autonomous vehicle to navigate a specific segment of the route. For instance, the trajectory can be translated and provided to the vehicle control system(s) that can generate specific control signals for the autonomous vehicle (e.g., adjust steering, braking, velocity, and so on). The specific control signals can cause the autonomous vehicle to move in accordance with the selected trajectory.

The technology of the present disclosure provides an improved framework for generating, selecting, and optimizing a trajectory for an autonomous vehicle. This can allow the vehicle computing system to select a trajectory from a variety of candidate trajectories to help ensure that the autonomous vehicle is traveling safely and comfortably. To do so, the vehicle computing system can obtain an initial travel path and map data from a map repository. In some examples, the initial travel path (e.g., a nominal path) can represent an ideal travel path from a first position to a second position without regard to any objects that may be in the current environment but are not included in the existing map data. For example, the initial travel path may not take the presence of other moving vehicles into account because the number and position of such objects can constantly change and thus can only be accurately determined by analyzing live sensor data.

The initial travel path can be based, at least in part, on the map data. For example, map data can include information about a particular geographic location including one or more geographic features including roads, boundaries (e.g., lane boundaries, curbs, etc.), buildings, information about expected traffic patterns, and so on. The initial travel path can be a nominal path for the autonomous vehicle with respect to geographic features such as, for example, a path that maintains the position of the autonomous vehicle within the lane boundaries on a travel way (e.g., lane lines on a road, etc.). In some implementations, the initial travel path can be pre-determined for a particular geographic area and stored (e.g., before the autonomous vehicle arrives in that particular geographic area). In some implementations, the data indicative of the initial travel path can be stored offline (by a remote computing system) and can be obtained by the vehicle computing system. In some implementations, the data indicative of the initial travel path can be encoded as a feature in the map data. The initial travel path can be determined in real-time by the autonomous vehicle or a remote computing system as the vehicle is traveling.

The vehicle computing system can generate a plurality of candidate trajectories based, at least in part, on the sensor data and the initial travel path. As described herein, the plurality of candidate trajectories can be executable trajectories that are dynamically feasible for the autonomous vehicle (and/or a vehicle model). For example, the autonomous vehicle can be capable of controlling its motion to travel to waypoint(s) that define a trajectory. A trajectory can be defined by a spatial path and/or steering quantities. A spatial path may be a vector-valued (e.g., x, y, yaw) continuous function of arc length. Curvature is a value that can be derived from the continuous function. Steering qualities can include, but are not limited to, the first and second derivative of curvature, steering angle, steering angle velocity, angular velocity, lateral speed, lateral acceleration, lateral jerk, derivatives with respect to arc length, and so on. A trajectory can also be associated with a particular period (e.g., 5 s, 8 s, 10 s, etc.) that indicates the time for the vehicle may travel along the trajectory's path with the associated parameters (e.g., velocity, acceleration, etc.). In some examples, the period can be associated with a planning cycle of the vehicle's motion planning system.

The vehicle computing system can obtain sensor data describing one or more objects within the surrounding environment of the autonomous vehicle and at least a subset of the object(s) can be positioned along one or more of the plurality of trajectories. An object may be considered to be positioned along a particular trajectory if at least a portion of the object encroaches/overlaps the particular trajectory or the outer edge of the object is within a threshold distance from the particular trajectory (e.g., 5 ft, 10 ft, 15 ft, 20 ft, etc.). Such object(s) can have higher relevance for planning the motion of autonomous vehicles than objects that do not encroach one or more of the plurality of trajectories or are located beyond the threshold distance. The threshold distance can represent a distance at which the autonomous vehicle may consider a lateral movement away from the object to increase the distance between the autonomous vehicle and the object (e.g., a buffer distance for passing the object). In some examples, the threshold distance may represent a blocking interval, which is a region along a candidate path that represents the area in which an actor may be considered to encroach or overlap with it.

Each trajectory can include a velocity profile and a lateral offset profile that are used to describe the position of the vehicle as it travels and the speed of the autonomous vehicle at different times during the trajectory (e.g., the velocity profile can include acceleration values and the time at which those acceleration values are to be implemented). When generating the plurality of candidate trajectories, the vehicle computing system can determine the velocity profile and the offset profile for each trajectory based, at least in part, on the detected object(s) and/or the initial travel path.

In some examples, a velocity profile can include data indicating one or more acceleration values and, for each acceleration value, a time at which that acceleration value will be implemented. For instance, a velocity profile can include a representation of a planned acceleration at one or more points in time. Based on this acceleration, a current velocity can be determined at any point in the acceleration. Additionally, or alternatively, the velocity profile can include one or more velocities and a time at which the autonomous vehicle will reach those velocities. The velocity profile can also include a vehicle jerk and/or an odometer position.

Additionally, or alternatively, the different types of velocity profiles can be used and/or generated based on the specific characteristics of a given initial travel path. For example, a first type of velocity profile can be associated with a situation in which emergency braking is necessary. The velocity profiles of the first type of velocity profile can be constructed using piece-wise constant jerk segments (i.e., the velocity profiles can comprise a sequence of cubic polynomials).

A second type of velocity profile can be associated with a situation in which a specific speed is a target (e.g., the autonomous vehicle is intending to achieve a particular speed and then coast at that speed). Velocity profiles of the second type can use piece-wise constant snap calculations (e.g., the velocity profiles can comprise a sequence of quartic polynomial functions).

A third type of velocity profile can be associated with a situation in which the autonomous vehicle is targeting a speed for a particular distance (e.g., stop signs, traffic lights, gridlock, or the predicted movement of other actors within the environment). Velocity profiles of the third type can use piece-wise constant crackle calculations (e.g., the velocity profiles can comprise a sequence of quintic polynomial functions).

In some examples, the velocity profiles can be generated based, at least in part, on map data including stopping locations such as stop signs, traffic lights, and/or traffic gridlock. The velocity profiles can also be generated based on speed targets associated with a legal speed limit or a velocity target associated with one or more other factors (e.g., measured average traffic velocity for a particular area). In addition, the velocity profiles can be generated based, at least in part, on the position and speed of actors in the location associated with the autonomous vehicles. In some examples, the vehicle computing system can predict the future movement of one or more actors for use during the generation of velocity profiles. In this way, the autonomous vehicles can adaptively adjust its motion/behavior so that it can travel behind or in front of another action (e.g., with a safe buffer distance).

An offset profile for a respective trajectory can include a plurality of offset values. An offset value can represent the distance and direction that the respective trajectory differs from the initial travel path at one or more times during the initial travel path. For example, a particular offset value may indicate that at a time 3 seconds into the path, the respective candidate trajectory places the autonomous vehicle 0.7 meters left of the initial travel plan. In some implementations, the offset profile can be represented as a line on a graph wherein one axis on the graph represents the degree and direction of lateral variation from the initial travel path and the other axis represents time. Each offset profile can be mapped onto the initial travel path to generate one or more trajectories. Thus, each trajectory follows the general path of the initial travel path with one or more lateral adjustments. The vehicle computing system can generate a large number of candidate trajectories for the vehicle. This allows many additional alternatives to quickly and efficiently be considered, while still maintaining a high degree of safety for the autonomous vehicle. For example, if the initial travel path can be represented as a path through an environment, the offset profile for a particular trajectory can be represented as a path that follows the general route of the initial travel path but is offset laterally along the initial travel path as a function of distance. The degree to which the particular trajectory is laterally offset from the initial travel path can be represented as a function of time.

The vehicle computing system can score each trajectory using one or more cost functions to ensure a safe, efficient, and comfortable vehicle motion. The cost functions can be encoded for the avoidance of object collision, for the autonomous vehicle to stay on the travel way/within lane boundaries, prefer gentle accelerations to harsh ones, etc. As further described herein, the cost function(s) can consider vehicle dynamics parameters (e.g., to keep the ride smooth, acceleration, jerk, etc.) and/or map parameters (e.g., speed limits, stops, travel way boundaries, etc.). The cost function(s) can include costs functions for calculating: dynamics costs, collision costs (e.g., cost of avoiding/experiencing potential collision, minimization of speed/or the energy of impact, etc.), overtaking buffer costs (e.g., give 4 ft of space with overtaking a bicycle, etc.), headway costs (e.g., preserve stopping distance when applying adaptive cruise control motion a moving object, etc.), actor caution costs (e.g., preserve the ability to stop for unlikely events, etc.), behavioral blocking costs (e.g., avoid overtaking backed-up traffic in the vehicle's lane, etc.), yielding costs, speed zone costs, stop guard costs, nominal path costs, lane road boundaries costs, gridlock costs, and/or other parameters. In some implementations, the cost function(s) can account for fixed buffer and/or speed dependent buffers (e.g., requiring more space for actors when the vehicle is passing at higher speeds, etc.). As seen above, the cost function(s) can account for map geometry features such as the distance from the initial travel path, the location of lane boundaries, and road boundaries.

Each of the above cost functions can generate a sub-cost value. Each sub-cost value can represent the cost of a particular aspect of a candidate trajectory. For example, one sub-cost value can represent the costs associated with overtaking another actor (e.g., generated by the overtaking buffer cost function), while another can represent the lane boundary costs (e.g., the cost of leaving a lane boundaries). The different cost functions can each generate a sub-cost value and these sub-cost values can be combined to generate a full cost of the candidate trajectory.

In some examples, each sub-cost value can be assigned a weight based on its particular importance. The final cost of a candidate trajectory can then be weighted towards the more important sub-cost values. For examples, the sub-cost value associated with a potential collision can be weighted more heavily than a sub-cost value associated with actor caution costs. In some examples, the weight of particular sub-cost value can depend on the current situation of the autonomous vehicle. Thus, overtaking buffer costs may be weighted more heavily on a single lane road than on a multi-lane highway.

The vehicle computing system can score the plurality of different candidate trajectories (each one having a different offset profile and a different velocity profile). The vehicle computing system (e.g., a scoring system of the motion planning system) can generate a score for each candidate trajectory based on the results of the plurality of cost functions. For example, the vehicle computing system can perform an object collision detection cost function to detect whether a trajectory will cause the autonomous vehicle to collide with any objects. This cost function can take, as input, a list of candidate trajectories, each candidate trajectory including a list of points that describe the position (e.g., based on an x, y coordinate plane) of the autonomous vehicle during that trajectory, the heading of the autonomous vehicle, and the velocity of the autonomous vehicle at each timestep for the planning horizon (e.g., eighty 0.1 second time steps for an eight second planning horizon). The vehicle computing system can access sensor data to determine the shape, object type, position, and future path of one or more objects. The path for each object can be represented as a series of points at each timestep (each point including the (x, y) position, the heading, and the velocity of the object), as described herein.

The vehicle computing system can plot the path of the autonomous vehicle represented by a specific trajectory and determine whether the autonomous vehicle will collide with one or more objects while following that particular trajectory. The object collision detection cost function can output, for each candidate trajectory, three values: an indication of whether a collision was predicted, the maximum relative speed during a predicted collision, and any other costs.

If the vehicle computing system determines that the autonomous vehicle will collide with an object while following a particular trajectory, the vehicle computing system (e.g., the scoring system) can generate a cost modifier for that particular trajectory that results in the particular trajectory having an increased cost (and is thus less likely to be selected). In some examples, any predicted collision will result in that trajectory being eliminated from consideration by the motion planning system. In some examples, the vehicle computing system can perform collision checking at each timestep in a plurality of timesteps.

The actor caution cost function can cause the autonomous vehicle to prioritize trajectories that allow the autonomous vehicle to slow such that it preserves the ability to stop when conflicting predictions are possible but unlikely. The actor caution cost function can take, as input, a list of candidate trajectories, a list of object trajectories likelihoods, and/or blocking interval information for each combination of candidate trajectory and likely object trajectory. In this context, the blocking intervals can represent the minimum and maximum odometer value (distance) that would result in a collision with an object. This blocking interval can be based on an along path speed associated with the autonomous vehicle. The actor caution cost function can determine a speed for each candidate trajectory that brings the autonomous vehicle closest to a particular object without causing a collision. Based on the determined speed, the actor caution cost function can output a one-dimensional vector including a cost for each candidate trajectory based on the comparison of the candidate trajectories, the speed limits they must stay under to avoid an unlikely future collision, and the object (obstacle) trajectory likelihoods.

The headway cost function can take, as input, a list of candidate trajectories (including the distance traveled, the velocity, and the acceleration for each timestep), a list of object trajectory likelihoods, and/or blocking interval information for each combination of candidate trajectory and object trajectory. In some examples, the blocking intervals can represent the minimum and maximum odometer value that would result in a collision with an object and the along path speed. The headway cost function can determine, for each time step and each trajectory object trajectory pair, whether the distance traveled is not past the end of the interval. If it is not, the headway cost function can generate a cost headway based on the difference between the odometer and the start of the interval, the velocity of the autonomous vehicle, the acceleration of the autonomous vehicle, and the along track velocity of the object. Thus, the output of the headway cost function is a per trajectory cost.

More specifically, the headway cost function can be intended to maintain a safe follow distance between the autonomous vehicle and a vehicle ahead of the autonomous vehicle. To do so, the path planning system maintains a blocking interval in front of the autonomous vehicle. Trajectories that violate this blocking interval can receive a cost penalty. The headway cost function can further simulate the position of the blocking interval if the leading vehicle were to suddenly brake (with the maximum amount of stopping force) given the current speed and velocity of the vehicle. The headway cost function can then penalize a candidate trajectory if it is going too fast to stop before the unlikely but possible position of the braked blocking interval.

The behavioral blocking cost function can cause the vehicle computing system to increase the cost of candidate route that violate the commonsense rules of the road but are not safety-critical. For example, undesirable behavior can include, but is not limited to, staying close to another vehicle traveling in the same lane, passing backed up traffic in the current lane, remaining in another vehicle's blind spot, and/or staying next to another vehicle turning in the same direction. The behavioral blocking cost function can use, as input, a list of the candidate trajectories (specifically including the longitudinal projection along the nominal path and the acceleration of the autonomous vehicle for each candidate trajectory) and a list of autonomous vehicle trajectory and object trajectory pairs.

The behavioral blocking cost function can generate a cost for each candidate trajectory based on determining whether an object is tracking the same path as the autonomous vehicle, determining whether the autonomous vehicle is blocking the object (a bike or pedestrian might not be behavioral blocking the autonomous vehicle from staying next to it/passing it), the maximum and minimum longitudinal projection along the nominal path, and/or the projected velocity along the nominal path. The behavioral blocking cost function can then determine, for each time step and for each pairing of the autonomous vehicle trajectories and object trajectories, if the distance between the autonomous vehicle and the object is between a particular distance (e.g., within a minimum and maximum distance), a cost can be attributed to the candidate trajectory. The total cost for all time steps and each object can be summed to generate a total cost for the candidate trajectory. In some examples, the cost added can be based on the velocity of the autonomous vehicle such that the autonomous vehicle may not pass a long line of backed-up cars in the lane of the autonomous vehicle. Thus, trajectories that pass too close to other vehicles can have an increased cost that increases the longer the distance is too close. Similar calculations can be used to increase the cost of remaining in a particular area nearby the object such as the object's blind spot or the position directly beside a vehicle in another lane. The behavioral blocking cost function can designate any area relative to an object to have an associated cost and can increase the cost the longer the autonomous vehicle remains in an area having a cost. The behavioral blocking cost function can output a cost value for each candidate trajectory.

In some examples, the behavioral blocking cost function can generate a cost for each candidate trajectory by projecting an object's minimum and maximum distance during a particular time step (based on estimated speed and position of the object) onto the candidate trajectory for each timestep. If the autonomous vehicle is behind that minimum and maximum distance projection, the behavioral blocking cost function can generate a penalty for trajectories that bring the autonomous vehicle within a certain distance of the object (to ensure that the autonomous vehicle has a good following distance). In addition, in this situation the system can limit braking to a certain amount, such that the autonomous vehicle will pass, rather than braking too hard.

The yielding cost function can take, as input, the distance until the autonomous vehicle enters the path of the object (used to estimate the autonomous vehicles estimated time of arrival in the path of the object), the autonomous vehicle's distance along the path of the object when the paths intersect, the velocity of the autonomous vehicle when intersecting with the path of the object, and similar values for when the autonomous vehicle exits the path of the object. The yielding cost function can also modify the predicted path of one or more objects based on predicted mitigating actions of the object. For example, if the yielding cost function determines that another vehicle is likely to yield, the predicted path of that vehicle can be updated to include the likely slowing of the vehicle. In some examples, the yielding cost function can determine the type of interaction (e.g., merging, path crossing, etc.). Based on the positions of the autonomous vehicle and the object as well as the interaction type, the yielding cost function can determine who has priority (or right of way). This determination can be used to up-weight or down-weight the importance of the burden placed on the other object. A cost can be generated for each trajectory based on when, and if, the object (e.g., the other vehicle) is expected to yield based on the input factors. If a large burden is placed on the other object, an increased cost can be generated. The yielding cost function can output a cost for each candidate trajectory.

The speed zone cost function can take, as input, for each candidate trajectory, the speed of the autonomous vehicle at each time step and the coordinates of the autonomous vehicle at each time step. The speed zone cost function can also take, as input, a longitudinal mapping of the speed limit in one-meter increments. The speed zone cost function can determine whether the autonomous vehicle exceeds the speed limit at each time step along the trajectory. The cost for each candidate trajectory can then be based on the number of time steps in which the autonomous vehicle exceeds the speed limit.

The nominal path cost function can generate a small cost based on the degree to which a candidate trajectory departs from the nominal path. The nominal path cost function can take, as input, the offset profile of the candidate trajectory being scored. In this way, the vehicle computing system can have a small preference for trajectories that remain near the nominal path.

The lane boundaries cost function can take, as input, at least the plurality of candidate trajectories (each trajectory including a location at each time step and the heading at each time step) and a lane boundary polygon. The lane boundary cost function can generate a cost based on determining, at each time step, whether the autonomous vehicle has moved outside of the lane boundaries. Thus, a trajectory that leaves the current lane of the autonomous vehicle can have a high cost (e.g., a lane boundary violation cost).

In some examples, the cost for a particular trajectory is generated based, at least in part, on the degree to which the trajectory follows established criteria for evaluating trajectories. For example, the stop guard cost function can, if the environment includes a stopping point (e.g., a stop sign), assign a high cost to a trajectory that does not stop before the stopping point. Similarly, a trajectory that stops well short of the stop point may be determined to have a high cost. In some examples, a trajectory that stops short may have a relatively high cost due to not receiving a "distance reward" which can reduce the cost of a trajectory.

A gridlock cost function can take, as input, a list of candidate trajectories. Each candidate trajectory can include information for the last timestep in the trajectory such as the distance traveled during the candidate trajectory and the longitudinal coordinate in the last timestep. Additionally, the gridlock cost function can take, as input, a list of object trajectories, object types, and blocking intervals for each pair of a trajectory and an object trajectory. The blocking intervals can be a maximum and minimum odometer value (along the trajectory) that would result in a collision. The blocking interval can also include a path speed. The gridlock cost function can determine, based on the last time step, whether the autonomous vehicle's longitudinal coordinate is within the (min, max) of the gridlock interval, the object is nearly stopped (<imps), and the blocking interval is ahead of the autonomous vehicle but before the end of the gridlock region. If so, the gridlock cost function can assign a fixed cost to this rollout for the trajectory.

The cost for a particular trajectory can be generated based, at least in part, on the spatial relationship between the particular trajectory and the other objects in the environment, including but not limited to other vehicles, buildings, signs, pedestrians, and so on. For example, if the other object is a person on a bicycle, the trajectory can be scored such that if the trajectory passes within a buffer distance, the cost can be high (e.g., based on the increased danger of a collision). Similarly, if the trajectory leaves the current lane, the cost may also be high. However, a trajectory that represents a path that passes outside of the buffer distance but does not leave the lane may have a relatively low cost.

In some examples, the vehicle computing system can utilize one or more policies for predicting the reactions of other actors in the environment. For instance, the vehicle computing system can predict one or more actions from other drivers or operators of other vehicles and thus may generate one or more confidence levels about the motion of other vehicles in the environment. The vehicle computing system can modify the determined score for a particular trajectory based on the confidence level associated with the predicted movement of other actors within the environment. For example, if the actor policy results in a prediction that the walking person will not cross the road with a 90 percent confidence (e.g., leaving around 10 percent chance the person will cross the road), the collision detector can generate a cost for a trajectory that is increased (e.g., wherein an increased cost represents a lower chance of being selected) based on a 10 percent chance that the walking person will cross the road but not as much as if the walking person was 90 percent likely to cross the road.

In some examples, a calculated cost for a particular trajectory can be based on whether the trajectory causes the autonomous vehicle to pass within a buffer distance of an object. In some examples, the buffer distance can be a predetermined, fixed distance. In some examples, the buffer distance can be determined based on the speed of the autonomous vehicle (e.g., the higher the velocity of the autonomous vehicle, the larger the buffer distance.)

In some implementations, the vehicle computing system can determine a cost based, at least in part, on the evaluation of a trajectory's associated spatial path using a spatial path cost function. For example, the vehicle computing system (e.g., a path evaluator of the motion planning system) can generate a cost for each trajectory based on a calculation of the smoothness of the path described by that trajectory (e.g., the path defined by the sequence of one or more associated waypoint(s), etc.). The smoother a path is calculated to be, the lower the cost and the higher the likelihood it will be selected to be executed. The vehicle computing system can calculate, for each position along a path, an acceleration value for that moment. The vehicle computing system can calculate a jerk value which represents the change in acceleration over time. The vehicle computing system can generate a score based on one or more of the maximum acceleration or jerk, the average acceleration or jerk, or a combination of both. In some examples, the vehicle computing system can generate a cost based on the degree of total deviation from the initial travel path. Thus, the distance of each offset value can be summed into a total offset value representing the total distance that the trajectory differs from the initial travel path. As a result, trajectories with paths that differ from the initial travel path less can receive a lower cost and, thus, can be more likely to be selected.

In some implementations, the vehicle computing system can determine a cost for a trajectory based, at least in part, on a vehicle motion policy cost function. For example, the vehicle computing system (e.g., a policy scoring system) can generate a cost (or component of a cost) for a particular trajectory based on the degree to which it complies with one or more vehicle motion policies of the motion planning system. A lower cost can represent a more preferable trajectory. For example, the vehicle computing system may include one or more vehicle motion policies that represent legal rules that govern the area in which the autonomous vehicle is traveling. Each rule may be assigned a weight and cost can be assigned to a trajectory based on the degree to which it follows that rule. Additionally, or alternatively, the vehicle computing system may have one or more vehicle motion policies not related to illegal restrictions but still assigned a weight. For example, the vehicle computing system can determine and implement a buffer zone that is to be maintained around the autonomous vehicle as a safety precaution. The buffer zone can be defined by one or more buffer distances. The vehicle computing system (e.g., scoring system) can generate a cost depending on whether or not the path represented by a particular trajectory directs the autonomous vehicle to travel too close (e.g., within the buffer distance) to one or more objects. In some examples, the buffer distance can be a fixed distance. In other examples, the buffer distances can be determined based on the current speed of the autonomous vehicle.

Each cost function can generate a sub-cost value, representing one aspect of the cost of a particular trajectory. Each sub-cost value can be assigned a weight based on one or more factors including the current situation of the autonomous vehicle. The sub-cost values can then be combined to produce a total cost of a trajectory at least partially based on the weights assigned to each sub-cost value.

The vehicle computing system can select a trajectory for the autonomous vehicle based, at least in part, on the determined costs for each respective trajectory. By way of example, once all of the candidate trajectories have been scored to generate an associated cost, the vehicle computing system (e.g., the motion planning system) can select the trajectory that has the lowest calculated cost.

Given the complexity of the vehicle computing system, it may be complicated to plan a trajectory such that input to the system results in the desired trajectory being taken by the autonomous vehicle. As a result, it may be necessary to synthesize a trajectory such that a complicated nonlinear system can be controlled in a linear manner. Specifically, to achieve this result, the vehicle computing system can ensure that the trajectories are planned by a flat system (e.g., a differentially flat system). A system is said to be flat if one set of variables (in some cases called flat outputs) exists such that the system (non-differentially) is algebraic over the differential field generated by the set of variables. For example, a system is flat if a set of outputs from the system exists from which all input and states can be determined without integration.

In the context of a vehicle control system, preserving flatness ensures that any point on the selected trajectory can be reliably reached based on input to the vehicle control system. Thus, inputs into the vehicle control system can correlate directly with specific outputs (e.g., the location of the autonomous vehicle). By preserving flatness, the vehicle computing system can avoid generating costs for generalized tubes (representing an average movement or area the autonomous vehicle is likely to be in) and instead directly costing executable trajectories (using more exact representations of the autonomous vehicle's path). This eliminates latency from the system and removes the need to keep a large buffer around the projected path of the autonomous vehicle while evaluating the costs of a given trajectory.

In some examples, the vehicle computing system can ensure that all generated trajectories preserve the flatness property such that regardless of which candidate trajectory is selected, the flatness property will be maintained. In other examples, trajectories are selected after generation to ensure the selected trajectory preserves flatness.

Some autonomous vehicles do not include or have not yet implemented a flat sampling system. In these cases, the vehicle computing system can optimize the selected trajectory to produce an optimized trajectory. For example, the selected trajectory can then be transmitted to an optimizer. The optimizer can analyze the selected trajectory to determine whether the trajectory includes any sections in which the acceleration and/or jerk for that section exceed a predetermined threshold for those values. If so, the optimizer can calculate one or more route alterations to reduce the values which exceed the predetermined threshold.

The vehicle computing system can control the motion of the autonomous vehicle based, at least in part, on the optimized trajectory. For instance, once a trajectory has been chosen and optimized, the motion planning system can transmit the trajectory to a vehicle controller. The vehicle controller can use the selected trajectory to generate one or more motion controls for the autonomous vehicle. By way of example, the vehicle controller can translate a trajectory into instructions for controlling the autonomous vehicle including adjusting the steering of the vehicle "X" degrees, adjusting a throttle for speed, and/or applying a certain magnitude of braking force. The vehicle controller can transmit those motion controls to the autonomous vehicle to be executed and follow the selected trajectory.

The systems and methods described herein provide a number of technical effects and benefits. More particularly, the systems and methods of the present disclosure provide improved techniques for generating trajectories for autonomous vehicles. For instance, the motion planning system (and its associated processes) can identify an optimal path between a first position and a second position by considering all (or many) lateral variations of an initial travel plan. Each variation can then be tested to determine whether it is predicted to collide with any objects via collision detection. Based on this determination, and an evaluation of a variety of other factors, each candidate trajectory can be assigned a cost. Selecting the trajectory with the lowest cost allows autonomous vehicles to be controlled in a manner that is both safer and more efficient.

In addition, the present system allows autonomous vehicles to plan trajectories that take the velocity of the autonomous vehicle into account when calculating the amount of buffer distance to give to other objects. Thus, the autonomous vehicle can increase velocity when a large buffer is possible and reduce velocity when needing to pass close to the object, all without compromising the safety of the object or the safety of the autonomous vehicle. In this way, autonomous vehicles can improve both the expected safety of a trip and the velocity at which the autonomous vehicle can travel.

The system can select trajectories that lean away from an object (e.g., slightly increase the lateral displacement of the trajectory away from an object) to allow the autonomous vehicle to pass objects at increased velocities. In addition, the system can use a robust collision checking model to evaluate each trajectory, reducing delays, and avoiding the problem of conservative route selection. Using actual collision checking allows the system to avoid approximations, which reduces the need for complex systems and code.

Thus, the disclosed systems and methods can improve path selection for autonomous vehicles and allow such vehicles to be controlled in a manner that increases safety, reduces travel time and unnecessary delays, and conserves fuel and processing power that would otherwise be wasted through less efficient path planning solutions.

Various means can be configured to perform the methods and processes described herein. For example, a computing system can include data obtaining unit(s), environment sensing unit(s), motion plan generation unit(s), scoring unit(s), selection unit(s), optimization unit(s) and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to determine an initial travel path for an autonomous vehicle from a first location to a second location. The means can be configured to obtain sensor data describing one or more objects within an environment (e.g., the surroundings) of the autonomous vehicle, wherein the one or more objects are positioned along the initial travel path. The means can be configured to generate a plurality of trajectories for the autonomous vehicle based, at least in part, on the sensor data and the initial travel path.

To generate a respective trajectory in the plurality of trajectories, the means can be configured to determine a velocity profile for the autonomous vehicle based, at least in part, on the one or more objects. The means can be configured to determine an offset profile for the autonomous vehicle based, at least in part, on the one or more objects, wherein the offset profile includes a plurality of offset values, each offset value represents a direction and distance of offset from the initial travel path at a point along the initial travel path. The means can be configured to determine a cost for each respective trajectory in the plurality of trajectories based, at least in part, on the obtained sensor data.

The means can be configured to select a trajectory based on the determined costs for each respective trajectory in the plurality of trajectories. The means can be configured to optimize the selected trajectory to produce an optimized trajectory. The means can be configured to control the motion of the autonomous vehicle based, at least in part, on the optimized trajectory.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the autonomous vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the autonomous vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with the operation of one or more vehicles (e.g., a fleet of vehicles), with the provision of vehicle services, and/or other operations as discussed herein.

For example, the operations computing system 104 can be configured to monitor and communicate with the autonomous vehicle 102 and/or its users to coordinate a vehicle service provided by the autonomous vehicle 102. To do so, the operations computing system 104 can manage a database that includes data including vehicle status data associated with the status of vehicles including the autonomous vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the autonomous vehicle).

The operations computing system 104 can communicate with the one or more remote computing devices 106 and/or autonomous vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radiofrequency) and/or any desired network topology (or topologies). For example, the communications network 108 can include a local area network (e.g., intranet), wide area network (e.g., Internet), wireless LAN network (e.g., via Wi-Fi), cellular network, a SATCOM network, VHF network, a HF network, a WiMAX based network, and/or any other suitable communications network (or combination thereof) for transmitting data to and/or from the autonomous vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the autonomous vehicle 102 including exchanging (e.g., sending and/or receiving) data or signals with the autonomous vehicle 102, monitoring the state of the autonomous vehicle 102, and/or controlling the autonomous vehicle 102. The one or more remote computing devices 106 can communicate (e.g., exchange data and/or signals) with one or more devices including the operations computing system 104 and the autonomous vehicle 102 via the communications network 108.

The one or more remote computing devices 106 can include one or more computing devices (e.g., a desktop computing device, a laptop computing device, a smartphone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the autonomous vehicle 102 including a location (e.g., latitude and longitude), a velocity, acceleration, a trajectory, and/or a path of the autonomous vehicle 102 based in part on signals or data exchanged with the autonomous vehicle 102. In some implementations, the operations computing system 104 can include the one or more remote computing devices 106.

The vehicle 102 can be ground-based (e.g., an automobile, bike, scooter, other light electric vehicles, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the autonomous vehicle 102 can provide driving and navigational operation with minimal and/or no interaction from a human driver present in the autonomous vehicle. A semi-autonomous operational mode can be one in which the autonomous vehicle 102 can operate with some interaction from a human driver present in the autonomous vehicle. Park and/or sleep modes can be used between operational modes while the autonomous vehicle 102 performs various actions including waiting to provide a subsequent vehicle service, and/or recharging between operational modes.

An indication, record, and/or other data indicative of the state of the autonomous vehicle, the state of one or more passengers of the autonomous vehicle, and/or the state of an environment including one or more objects (e.g., the physical dimensions and/or appearance of the one or more objects) can be stored locally in one or more memory devices of the autonomous vehicle 102. Additionally, the autonomous vehicle 102 can provide data indicative of the state of the autonomous vehicle, the state of one or more passengers of the autonomous vehicle, and/or the state of an environment to the operations computing system 104, which can store an indication, record, and/or other data indicative of the state of the one or more objects within a predefined distance of the autonomous vehicle 102 in one or more memory devices associated with the operations computing system 104 (e.g., remote from the autonomous vehicle). Furthermore, the autonomous vehicle 102 can provide data indicative of the state of the one or more objects (e.g., physical dimensions and/or appearance of the one or more objects) within a predefined distance of the autonomous vehicle 102 to the operations computing system 104, which can store an indication, record, and/or other data indicative of the state of the one or more objects within a predefined distance of the autonomous vehicle 102 in one or more memory devices associated with the operations computing system 104 (e.g., remote from the autonomous vehicle).

The vehicle 102 can include and/or be associated with the autonomous vehicle computing system 112. The vehicle computing system 112 can include one or more computing devices located onboard the autonomous vehicle 102. For example, the one or more computing devices of the vehicle computing system 112 can be located on and/or within the autonomous vehicle 102. The one or more computing devices of the vehicle computing system 112 can include various components for performing various operations and functions. For instance, the one or more computing devices of the vehicle computing system 112 can include one or more processors and one or more tangible, non-transitory, computer-readable media (e.g., memory devices). The one or more tangible, non-transitory, computer-readable media can store instructions that when executed by the one or more processors cause the autonomous vehicle 102 (e.g., its computing system, one or more processors, and other devices in the autonomous vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), onboard diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the autonomous vehicle 102 (e.g., within range of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the autonomous vehicle 102 including a front side, rear side, left side, right side, top, or bottom of the autonomous vehicle 102. The autonomy sensor data 116 can be indicative of locations associated with the one or more objects within the surrounding environment of the autonomous vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the autonomous vehicle 102. For example, the map data 122 can provide information regarding: the identity and location of different roadways, road sections, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine the current position of the autonomous vehicle 102. The positioning system 118 can be any device or circuitry for analyzing the position of the autonomous vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the autonomous vehicle 102 can be used by various systems of the vehicle computing system 112 and/or provided to one or more remote computing devices (e.g., the operations computing system 104 and/or the remote computing device 106). For example, the map data 122 can provide the autonomous vehicle 102 relative positions of the surrounding environment of the autonomous vehicle 102. The vehicle 102 can identify its position within the surrounding environment (e.g., across six axes) based at least in part on the data described herein. For example, the autonomous vehicle 102 can process the autonomy sensor data 116 (e.g., LIDAR data, camera data) to match it to a map of the surrounding environment to get an understanding of the autonomous vehicle's position within that environment (e.g., transpose the autonomous vehicle's position within its surrounding environment).

The autonomy computing system 120 can include a perception system 124, a prediction system 126, a motion planning system 128, and/or other systems that cooperate to perceive the surrounding environment of the autonomous vehicle 102 and determine a motion plan for controlling the motion of the autonomous vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the autonomous vehicle 102 according to the motion plan.

The perception system 124 can identify one or more objects that are proximate to the autonomous vehicle 102 based on autonomy sensor data 116 received from the autonomy system sensors 114. In particular, in some implementations, the perception system 124 can determine, for each object, state data 130 that describes the current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over several iterations. In particular, the perception system 124 can update the state data 130 for each object at each iteration. Thus, the perception system 124 can detect and track objects (e.g., vehicles, bicycles, pedestrians, etc.) that are proximate to the autonomous vehicle 102 over time, and thereby produce a presentation of the world around a vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the autonomous vehicle 102. The prediction data 132 can be indicative of one or more predicted future locations of each respective object. The prediction data 132 can be indicative of a predicted path (e.g., predicted trajectory) of at least one object within the surrounding environment of the autonomous vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the autonomous vehicle 102 based at least in part on the prediction data 132 (and/or other data). The motion plan data 134 can include vehicle actions with respect to the objects proximate to the autonomous vehicle 102 as well as the predicted movements. For instance, as described herein, the motion planning system 128 can generate a plurality of candidate trajectories, each one a lateral variation of an initial travel plan. The motional planning system 128, or a subsystem thereof, can select a trajectory from the plurality of candidate trajectories. In some examples, selecting a trajectory can considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the autonomous vehicle 102 can perform a certain action (e.g., pass an object) without increasing the potential risk to the autonomous vehicle 102 and/or violating any traffic laws (e.g., speed limits, lane boundaries, signage). The motion plan data 134 can include a planned trajectory, velocity, acceleration, and/or other actions of the autonomous vehicle 102.

As one example, in some implementations, the motion planning system 128 can determine a cost function for each of one or more candidate trajectories for the autonomous vehicle 102 based at least in part on the current locations and/or predicted future locations and/or moving paths of the objects. For example, the cost function can describe a cost (e.g., overtime) of adhering to a particular candidate trajectory. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine the cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the autonomous vehicle actions, a planned trajectory, and/or other operating parameters to the vehicle control systems 138 to implement the motion plan data 134 for the autonomous vehicle 102. For instance, the autonomous vehicle 102 can include a mobility controller configured to translate the motion plan data 134 into instructions. By way of example, the mobility controller can translate a determined motion plan data 134 into instructions for controlling the autonomous vehicle 102 including adjusting the steering of the autonomous vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and it's one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the autonomous vehicle 102. The communications system 136 can also be configured to enable the autonomous vehicle to communicate with and/or provide and/or receive data and/or signals from a remote computing device 106 associated with a user and/or an item (e.g., an item to be picked up for a courier service). The communications system 136 can utilize various communication technologies including, for example, radiofrequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., the screen of a tablet, laptop, and/or smartphone) can be viewable by a user of the autonomous vehicle 102 that is located in the front of the autonomous vehicle 102 (e.g., driver's seat, front passenger seat). Additionally, or alternatively, a display device can be viewable by a user of the autonomous vehicle 102 that is located in the rear of the autonomous vehicle 102 (e.g., a passenger seat in the back of the autonomous vehicle).

Figure 2:
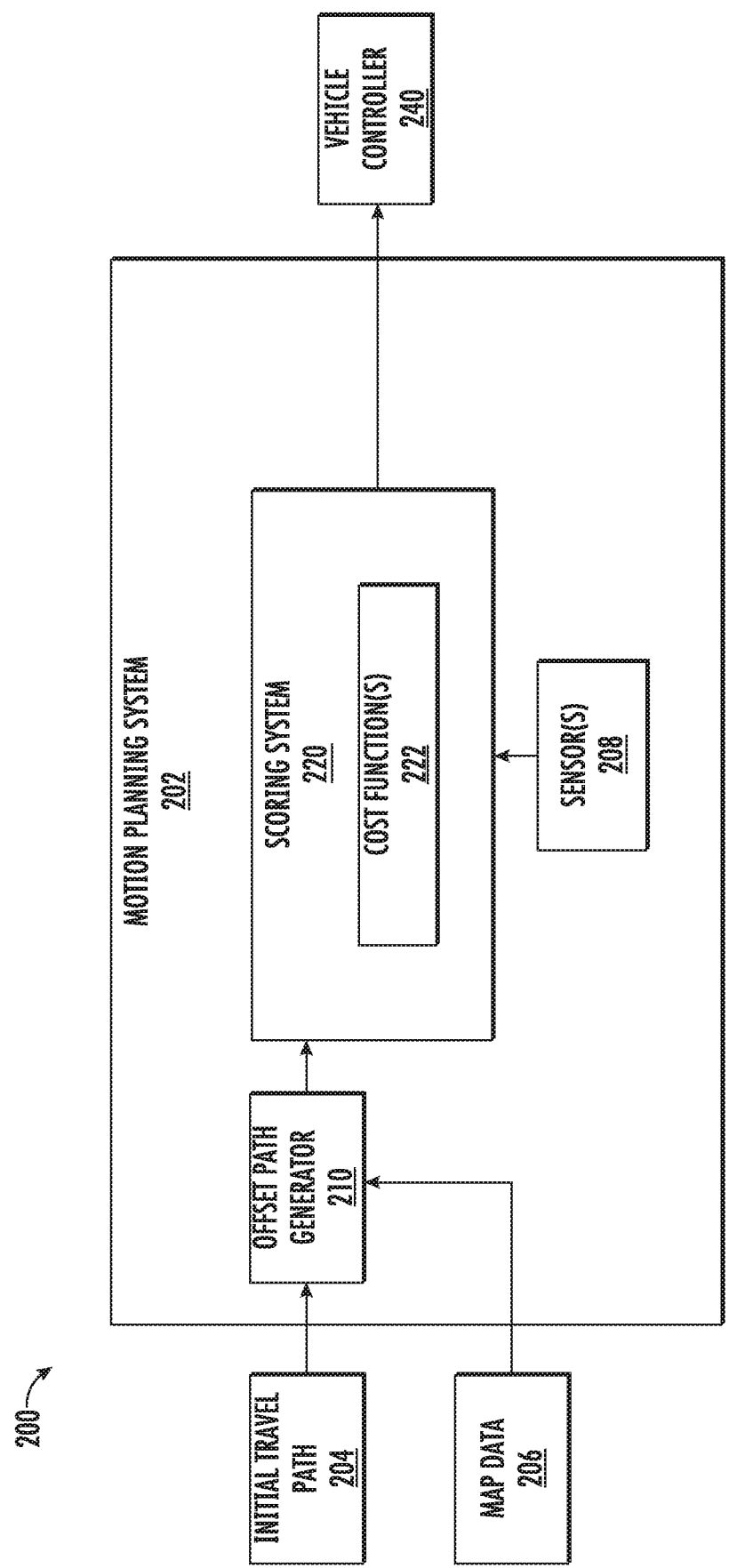
FIG. 2 depicts a block diagram of an example motion planning system according to example embodiments of the present disclosure.

FIG. 2 depicts a block diagram of an example motion planning system 202 according to example embodiments of the present disclosure. Specifically, the motion planning system 202 can be used to provide an improved framework for generating, selecting, and optimizing a trajectory for an autonomous vehicle. The motion planning system 202 can include an offset path generator 210, a scoring system 220, and one or more sensor(s) 208. In some examples, the motion planning system may not utilize flat sampling techniques and thus may include an optimizer.

The motion planning system 202 can obtain an initial travel path 204 and map data 206 from a map repository (not depicted). In some examples, the initial travel path 204 (e.g., a nominal path) can represent an ideal travel path 204 from a first position to a second position without regard to any objects that may be in the current environment but are not included in existing map data. For example, the initial travel path 204 may not take the presence of other moving vehicles into account because the number and position of such objects are constantly changing and can be accounted for by live sensor data.

The initial travel path 204 can be based, at least in part, on the map data 206. For example, map data 206 can include information about a particular geographic location including one or more geographic features including roads, boundaries (e.g., lane boundaries, curbs, etc.), buildings, information about expected traffic patterns, and so on. The initial travel path 204 can be a nominal path for the autonomous vehicle (e.g., autonomous vehicle 102 in FIG. 1) with respect to geographic features such as, for example, a path that maintains the position of the autonomous vehicle (e.g., autonomous vehicle 102 in FIG. 1) within two lane boundaries on a travel way (e.g., lane lines on a road, etc.). In some implementations, the initial travel path 204 can be predetermined for a particular geographic area and stored (e.g., prior to the vehicle traveling in that area). An initial travel path 204 or nominal path can represent an optimal path through the geographic area when there are no other vehicles or other temporary obstacles.

In some implementations, the data indicative of the initial travel path 204 can be stored offline (by a remote computing system) and can be obtained by the vehicle computing system (e.g., vehicle computing system 112 in FIG. 1). In some implementations, the data indicative of the initial travel path 204 can be encoded as a feature in the map data. The initial travel path 204 can be determined in real-time by the autonomous vehicle or a remote computing system as the vehicle is traveling.

The motion planning system 202 can obtain sensor data from one or more sensor(s) 208 describing one or more objects within the surrounding environment of the autonomous vehicle (e.g., autonomous vehicle 102 in FIG. 1) and at least a subset of the object(s) can be positioned along the initial travel path 204. An object may be considered to be positioned along the initial travel path 204 in the event that a least a portion of the object encroaches/overlaps the initial travel path 204 or the outer edge of the object is within a threshold distance from the initial travel path (e.g., 5 ft, 10 ft, 15 ft, 20 ft, etc.). Such object(s) can have higher relevance for planning the motion of the autonomous vehicles than object(s) that do not encroach on the initial travel path 204 or are located beyond the threshold distance. The threshold distance can represent a distance at which the autonomous vehicle (e.g., autonomous vehicle 102 in FIG. 1) may consider a lateral movement away from the object to increase the distance between the autonomous vehicle (e.g., autonomous vehicle 102 in FIG. 1) and the object (e.g., a buffer distance for passing the object). The threshold distance can include, for example, 2 meters while traveling at low speeds or up to 5 meters while traveling at high speeds.

The motion planning system 202 can transmit the initial travel path 204 and map data 206 as input to the offset path generator 210. The offset path generator 210 can generate a plurality of trajectories based, at least in part, on sensor data and the initial travel path 204. As described herein, the plurality of trajectories can be executable trajectories that are dynamically feasible for the autonomous vehicle (and/or a vehicle model). For example, the autonomous vehicle can be capable of controlling its motion to travel to waypoint(s) that define a trajectory. A trajectory can be defined by a spatial path (e.g., x, y, yaw, curvature, etc.) and/or steering quantities (e.g., wrench, twist, steering angle, steering angle velocity, angular velocity, lateral speed, lateral acceleration, lateral jerk, etc.). A trajectory can also be associated with a particular time period (e.g., 5 s, 8 s, 10 s, etc.) that indicates the time for the vehicle may travel along the trajectory's path with the associated parameters (e.g., velocity, acceleration, etc.). The time period can also, or alternatively, be associated with a planning cycle of the motion planning system 202.

Each trajectory can include a velocity profile and a lateral offset profile that are used to describe the position of the autonomous vehicle (e.g., autonomous vehicle 102 in FIG. 1) as it travels and the speed of the autonomous vehicle (e.g., autonomous vehicle 102 in FIG. 1) at different times during the trajectory (e.g., the velocity profile can include acceleration values and the time at which those acceleration values are to be implemented). When generating the plurality of trajectories, the offset path generator 210 can determine the velocity profile and the offset profile for each trajectory at least partially based on the detected object(s) and/or the initial travel path.

A velocity profile can include data indicating one or more acceleration values and, for each acceleration value, a time at which that acceleration value will be implemented. For instance, a velocity profile can include a representation of a planned acceleration at one or more points in time. Based on this acceleration, a current velocity can be determined at any point in the acceleration. Additionally, or alternatively, the velocity profile can include one or more velocities and a time at which the vehicle will reach those velocities. The velocity profile can also include a vehicle jerk and/or an odometer position. In some examples, the velocity profiles can be generated based, at least in part, on map data including stopping locations such as stop signs, traffic lights, and/or traffic gridlock. The velocity profiles can also be generated based on speed targets associated with a legal speed limit or a velocity target associated with one or more other factors (e.g., measured average traffic velocity for a particular area).

Additionally, or alternatively, the different types of velocity profiles can be used and/or generated based on the specific characteristics of a given initial travel path. For example, a first type of velocity profile can be associated with a situation in which emergency braking is necessary. The velocity profiles of the first type of velocity profile can be constructed using piece-wise constant jerk segments (i.e., the velocity profiles can comprise a sequence of cubic polynomials).

A second type of velocity profile can be associated with a situation in which a specific speed is the target (e.g., the autonomous vehicle is intending to achieve a particular speed and then coast at that speed). Velocity profiles of the second type can use piece-wise constant snap calculations (i.e., the velocity profiles can comprise a sequence of quartic polynomial functions).

A third type of velocity profile can be associated with a situation in which the autonomous vehicle is targeting a speed for a particular distance (e.g., stop signs, traffic lights, gridlock, or the predicted movement of other actors within the environment. Velocity profiles of the third type can use piece-wise constant crackle calculations (i.e., the velocity profiles can comprise a sequence of quintic polynomial functions).

An offset profile for a respective trajectory can include a plurality of offset values. An offset value can represent the distance and direction that the respective trajectory differs from the initial travel path 204 at one or more times during the initial travel path 204. For example, a particular offset value may indicate that at a time 3 seconds into the path, the respective candidate trajectory places the autonomous vehicle 0.7 meters north of the initial travel plan 204. In some implementations, the offset profile can be represented as a line on a graph wherein one axis on the graph represents the degree and direction of lateral variation from the initial travel path 204 and the other axis represents time. Each offset profile can be mapped onto the initial travel path to generate one or more trajectories. Thus, each trajectory follows the general path of the initial travel path 204 with one or more lateral adjustments. The vehicle computing system can generate a large number of potential trajectories for the vehicle, such that most if not all possible paths are represented as a lateral deviation from the initial travel path. This allows many additional alternatives to quickly and efficiently be considered, while still maintaining a high degree of safety for the autonomous vehicle. For example, if the initial travel path 204 can be represented as a path through an environment, the offset profile for a particular trajectory can be represented as a path that follows the general route of the initial travel path but is offset laterally along the initial travel path distance. The degree to which the particular trajectory is laterally offset from the initial travel path can be represented as a function of time.

The scoring system 220 can determine a cost for each respective trajectory in the plurality of trajectories based, at least in part, on the data obtained from the one or more sensor(s). For instance, the scoring system 220 can score each trajectory against a cost function that ensures safe, efficient, and comfortable vehicle motion. A cost function can be encoded for one or more of: the avoidance of object collision, keeping the autonomous vehicle on the travel way/within lane boundaries, preferring gentle accelerations to harsh ones, etc. As further described herein, the cost function(s) can consider vehicle dynamics parameters (e.g., to keep the ride smooth, acceleration, jerk, etc.) and/or map parameters (e.g., speed limits, stops, travel way boundaries, etc.). The cost function(s) can also, or alternatively, take into account at least one of the following object cost(s): collision costs (e.g., cost of avoiding/experience potential collision, minimization of speed, etc.); overtaking buffer (e.g., give 4 ft of space with overtaking a bicycle, etc.); headway (e.g., preserve stopping distance when applying adaptive cruise control motion a moving object, etc.); actor caution (e.g., preserve the ability to stop for unlikely events, etc.); behavioral blocking (e.g., avoid overtaking backed-up traffic in the vehicle's lane, etc.); or other parameters. In some implementations, the cost function(s) can account for fixed buffer and/or speed dependent buffers (e.g., requiring more space for actors when the vehicle is passing at higher speeds, etc.). In some implementations, the cost function(s) can account for map geometry features such as the distance from the initial travel path, the location of lane boundaries, and road boundaries.

The scoring system 220 can score the plurality of different trajectories (each one having a different offset profile and a different velocity profile). The scoring system 220 can generate a score for each candidate trajectory based on a number of factors. For example, the scoring system 220 can perform object collision detection to detect whether a trajectory will cause the autonomous vehicle to collide with any objects.

In some examples, the scoring system 220 can include one or more cost functions 222. The one or more cost functions 222 can access sensor data to determine the position and future path of one or more objects, as described herein. The one or more cost functions 222 can plot the path of the autonomous vehicle represented by a specific trajectory and determine whether the autonomous vehicle will collide with one or more objects while following that specific trajectory.

In the event that the one or more cost functions 222 determine that the autonomous vehicle will collide with an object while following a particular trajectory, the one or more cost functions 222 can generate a cost modifier to make that particular trajectory less likely to be chosen. In some examples, any predicted collision will result in that trajectory being eliminated from consideration by the motion planning system. In some examples, the one or more cost functions 222 can perform collision checking at each timestep in a plurality of timesteps.

In some examples, the cost for a particular trajectory is generated based, at least in part, on the degree to which the trajectory follows established criteria for evaluating trajectories. For example, if the environment includes a stopping point (e.g., a stop sign), a trajectory that does not stop before the stop point can be determined to have a high cost. Similarly, a trajectory that stops well short of the stop point may be determined to have a high cost. In some examples, the best trajectory can be a trajectory that travels as far as possible while still stopping before the stop point. In another example, a trajectory that leaves the current lane of the autonomous vehicle will have a high cost (e.g., a lane boundary violation cost).

The cost for a particular trajectory can be generated by the one or more cost functions 222 based, at least in part, on the spatial relationship between the particular trajectory and the other objects in the environment, including but not limited to: other vehicles, buildings, signs, pedestrians, and so on. For example, if the other object is a person on a bicycle, the trajectory can be scored such that if the trajectory passes within a buffer distance, the cost can be high (e.g., based on the increased danger of a collision). Similarly, if the trajectory leaves the current lane, the cost may also be high due to a lane violation penalty. However, a trajectory that represents a path that passes outside of the buffer distance but does not leave the lane may have a relatively low cost.

In some examples, the one or more cost functions 222 can utilize one or more policies for predicting the reactions of other actors in the environment. For instance, the one or more cost functions 222 can predict one or more actions from other drivers or operators of other vehicles and thus may generate one or more confidence levels about the motion of other vehicles in the environment. The one or more cost functions 222 can modify the determined score for a particular trajectory based on the confidence level associated with the predicted movement of other actors within the environment. For example, if the actor policy results in a prediction that the walking person will not cross the road with a 90 percent confidence (e.g., leaving around 10 percent chance the person will cross the road), the one or more cost functions 222 can generate a cost for a trajectory that is increased (e.g., wherein an increased cost represents a lower chance of being selected) based on a 10 percent chance that the walking person will cross the road but not as much as if the walking person was 100 percent likely to cross the road.

In some examples, a calculated cost for a particular trajectory can be based on whether the trajectory causes the autonomous vehicle to pass within a buffer distance of an object. In some examples, the buffer distance can be a predetermined, fixed distance. In some examples, the buffer distance can be determined based on the speed of the autonomous vehicle (e.g., the higher the velocity of the autonomous vehicle, the larger the buffer distance.)

The scoring system 220 can generate or modify a predicted cost based, at least in part, on a determination of whether a trajectory will result in a burden on another actor in the environment. The one or more cost functions 222 can determine that a burden is placed on another actor when the system predicts the other actor will need to react to the action of the autonomous vehicle. For example, if the trajectory calls for a lane change into a lane in which another vehicle is traveling at a higher speed than the autonomous vehicle, the one or more cost functions 222 may determine that a burden has been placed on the other vehicle because that other vehicle will eventually need to reduce its speed or change lanes. The greater the burden placed on another actor (e.g., how quickly the other actor will likely need to react or the degree of reaction necessary) the larger the cost estimated by the one or more cost functions 222.

In some implementations, the scoring system 220 can determine a cost based, at least in part, on the evaluation of a trajectory's associated spatial path. For example, the vehicle computing system (e.g., a path evaluator of the motion planning system) can generate a cost for each trajectory based on a calculation of the smoothness of the path described by that trajectory (e.g., the path defined by the sequence of associated waypoint(s), etc.). The smoother a path is calculated to be, the lower the cost and the higher the likelihood it will be selected to be executed. The vehicle computing system can calculate, for each position along a path, an acceleration value for that moment. The vehicle computing system can calculate a jerk value which represents the change in acceleration over time. The vehicle computing system can generate a score based on one or more of: the maximum acceleration or jerk, the average acceleration or jerk, or a combination of both. In some examples, the vehicle computing system can generate a cost based on the degree of total deviation from the initial travel path. Thus, the distance of each offset value can be summed into a total offset value representing the total distance that the trajectory differs from the initial travel path. As a result, trajectories with paths that differ from the initial travel path less can receive a lower cost and, thus, can be more likely to be selected.

The scoring system 220 can select a trajectory for the autonomous vehicle based, at least in part, on the determined costs for each respective trajectory. By way of example, once all of the candidate trajectories have been scored to generate an associated cost, the scoring system 220 (e.g., the motion planning system) can select the trajectory that has the lowest calculated cost.

The optimizer 230 can optimize the selected trajectory to produce an optimized trajectory. The optimizer 230 can analyze the selected trajectory to determine whether the trajectory includes any sections in which the acceleration and/or jerk for that section exceed a predetermined threshold for those values. If so, the optimizer 230 can calculate one or more route alterations to reduce the values which exceed the predetermined threshold. Thus, the optimizer 230 can produce an optimized trajectory based on the selected trajectory.

The motion planning system 202 can use the optimized trajectory to determine one or more motion controls that can be used to control the autonomous vehicle to follow the optimized trajectory. The one or more motion controls can be transmitted to a vehicle controller 240. In some examples, the vehicle controller 240 can control the motion of the autonomous vehicle based, at least in part, on the received motion controls to follow the optimized trajectory.

In another example, once a trajectory has been chosen and optimized, the motion planning system 202 can transmit the trajectory to a vehicle controller 240. The vehicle controller 240 can use the selected trajectory to generate one or more motion controls for the autonomous vehicle. By way of example, the vehicle controller 240 can translate a trajectory into instructions for controlling the autonomous vehicle including adjusting the steering of the vehicle "X" degrees, adjusting a throttle for speed, and/or applying a certain magnitude of braking force. The vehicle controller 240 can transmit those motion controls to the autonomous vehicle to be executed and follow the selected trajectory.

Figure 3:
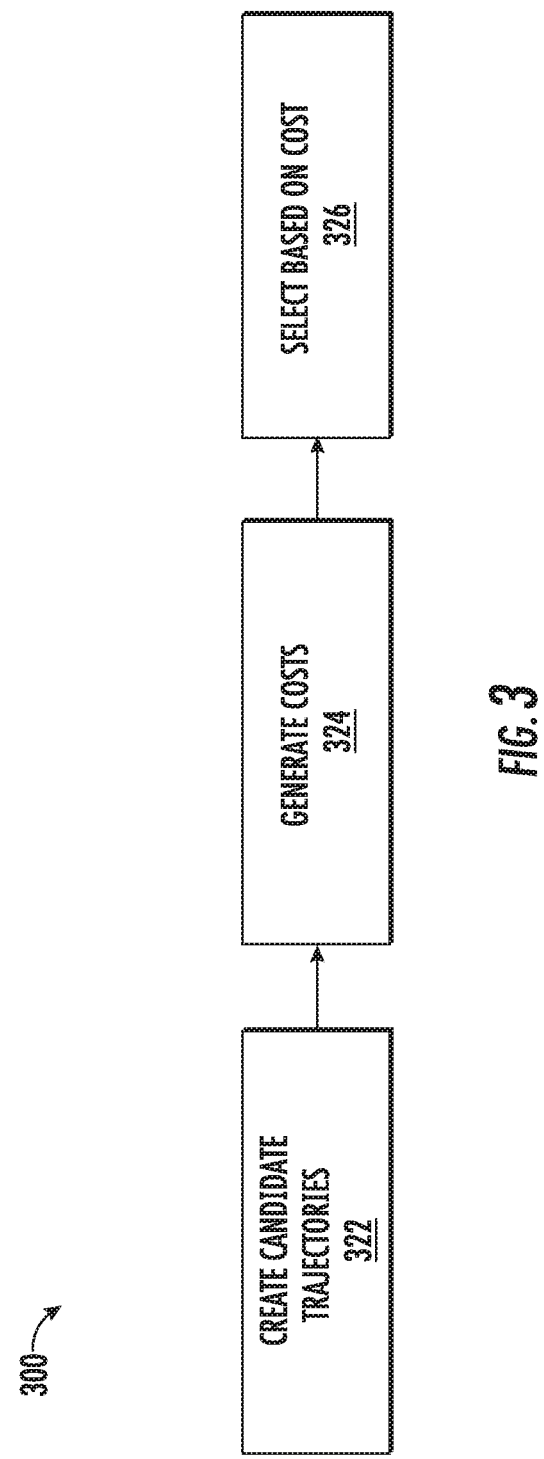
FIG. 3 depicts a block diagram of an example trajectory generation, evaluation, and selection system according to example embodiments of the present disclosure.

FIG. 3 depicts a block diagram of an example trajectory generation, evaluation, and selection system 300 according to example embodiments of the present disclosure. In some examples, the trajectory generation and selection system 300 includes a plurality of steps, each step performing a particular process that is part of generating costs for a plurality of trajectories.

In some examples, the trajectory generation and selection system 300 can create a plurality of candidate trajectories to be evaluated. In some examples, the trajectory generation and selection system 300 can access an initial travel path from a map repository and/or a path repository. The trajectory generation, evaluation, and selection system 300 can generate a plurality of candidate trajectories, each candidate trajectory can be generated programmatically by applying a series of offsets to the initial travel path. An offset can include information describing both the variation in position (e.g., a series of direction and degree offset values that describe the degree to which the respective candidate trajectory varies from the initial travel path) and velocity. In some examples, the trajectory generation and selection system 300 can generate a candidate trajectory for each possible offset given an initial set of possible offsets.

In some examples, once the plurality of candidate trajectories have been generated, the trajectory generation and selection system 300 can generate a cost value for each candidate trajectory. The cost value for a particular candidate trajectory can be based on an evaluation of the specific trajectory. In some examples, the trajectory generation and selection system 300 can determine whether the specific candidate trajectory will result in a collision with another object (e.g., a vehicle, a stationary object, and so on). In some examples, a trajectory generation and selection system 300 can remove candidate trajectories that result in a likely collision from consideration or give such candidate trajectories a very high cost, such that it will not be selected unless no other trajectories are possible.

In some examples, the trajectory generation and selection system 300 can generate a cost such that candidate trajectories that are more similar to the initial travel path are assigned lower costs than candidate trajectories that are less similar to the initial travel path, all other things being equal. In addition, candidate trajectories that are smoother (e.g., fewer turns, fewer changes in acceleration and speed, and so on) receive lower-cost scores than candidate trajectories that are less smooth. Furthermore, candidate trajectories that travel a route more quickly and/or efficiently can also receive a lower cost value.

In some examples, once each candidate trajectory in the plurality of candidate trajectories has received an associated cost value, the trajectory generation and selection system 300 can select the candidate trajectory with the lowest cost value.

Figure 4:
FIG. 4 depicts a graphical representation of a plurality of offset profiles according to example embodiments of the present disclosure.

FIG. 4 depicts a graphical representation of a plurality of offset profiles 400 according to example embodiments of the present disclosure. In some examples, each offset profile can represent a degree and direction that an associated candidate trajectory varies from the initial travel path. The offset profiles 400 can be generated without a specific initial travel path in mind and then applied to a plurality of different initial travel paths as needed.

Figure 5:
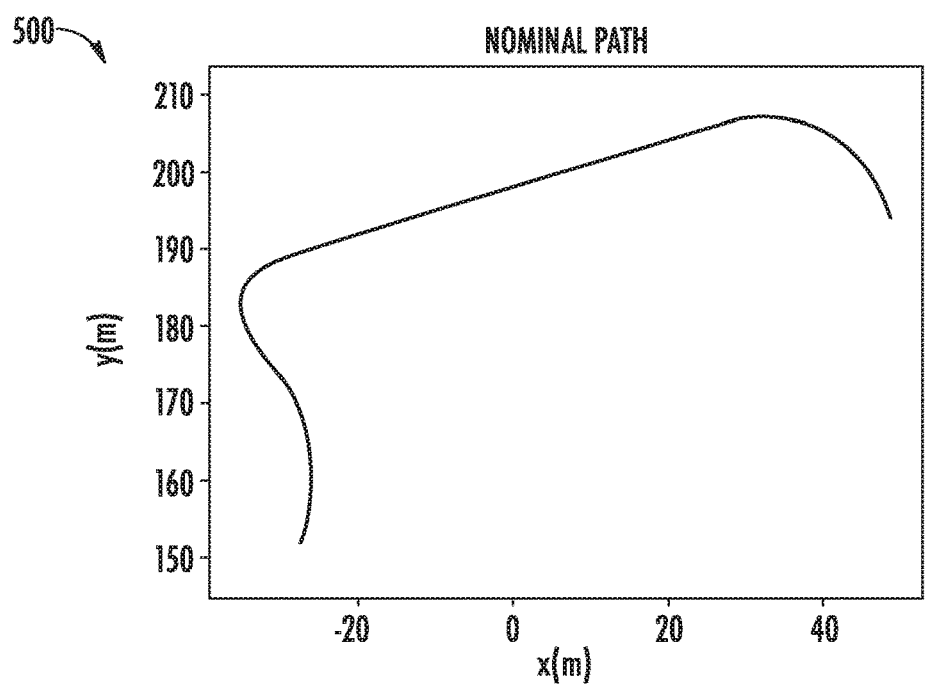
FIG. 5 depicts a graphical representation of an initial travel path according to example embodiments of the present disclosure.

FIG. 5 depicts a graphical representation of an initial travel path 500 according to example embodiments of the present disclosure. The initial travel path can represent a path from an initial location to a target location.

Figure 6:
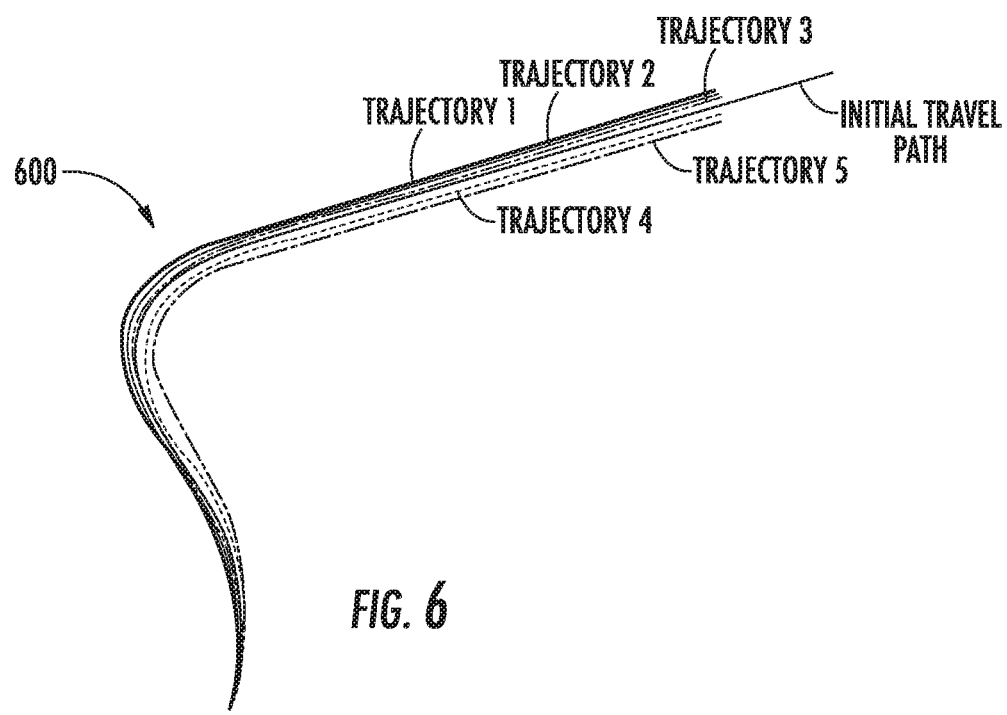
FIG. 6 depicts a graphical representation of a plurality of candidate trajectories according to example embodiments of the present disclosure.

FIG. 6 depicts a graphical representation of a plurality of candidate trajectories according to example embodiments of the present disclosure. As seen herein, the plurality of offset profiles (e.g., offset profiles 400 in FIG. 4) can be applied to an initial travel path (e.g., initial travel path 500 in FIG. 5) to create a plurality of candidate trajectories. These candidate trajectories can be evaluated (e.g., a cost value can be generated) such that the best candidate trajectory can be selected.

Figure 7:
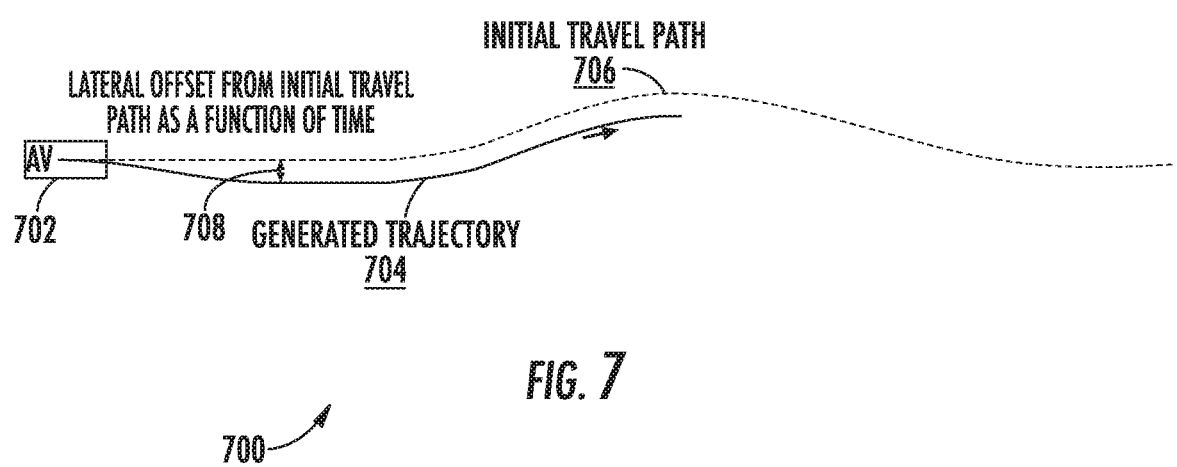
FIG. 7 depicts a graphical representation of a generated trajectory according to example embodiments of the present disclosure.

FIG. 7 depicts a graphical representation of a generated trajectory according to example embodiments of the present disclosure. In some examples, an autonomous vehicle 702 can receive an initial travel path 706 from a map repository or other source. As depicted in the figure, the initial travel path 706 can be a path that the autonomous vehicle 702 would travel if there were no obstacles in the travel path. However, given that sensor data may indicate one of our obstacles the autonomous vehicle can generate an altered trajectory. The generated trajectory 704 has an offset 708 from the initial travel path that varies from the initial travel path 706.

In some examples, the autonomous vehicle 702 can travel along the generated trajectory 704. In some examples, the autonomous vehicle can travel along the generated trajectory 704 for a given period to reach a final destination.

Figure 8A:
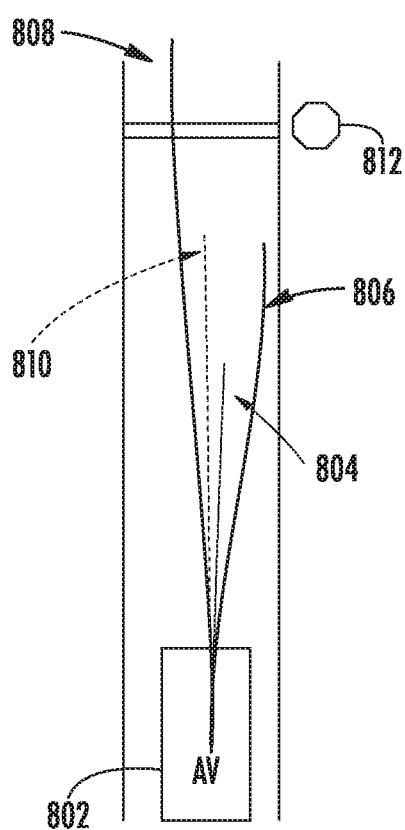
FIG. 8A depicts a graphical representation of a plurality of trajectories near a stop line according to example embodiments of the present disclosure.

FIG. 8A depicts a graphical representation of a plurality of trajectories 800 near a stop line according to example embodiments of the present disclosure. In some examples, the cost for a particular trajectory is generated based, at least in part, on the degree to which the trajectory follows established criteria for evaluating trajectories. For example, if the environment includes a stopping point 812 (e.g., a stop sign), an example trajectory 808 that does not stop before the stop point can be determined to have a high cost. Similarly, an example trajectory 804 that stops well short of the stop point may be determined to have a high cost. In some examples, the best trajectory can be an example trajectory 810 that travels as far as possible while still stopping before the stop point. In another example, an example trajectory 806 that leaves the current lane of the autonomous vehicle will have a high cost (e.g., a lane boundary violation cost).

Figure 8B:
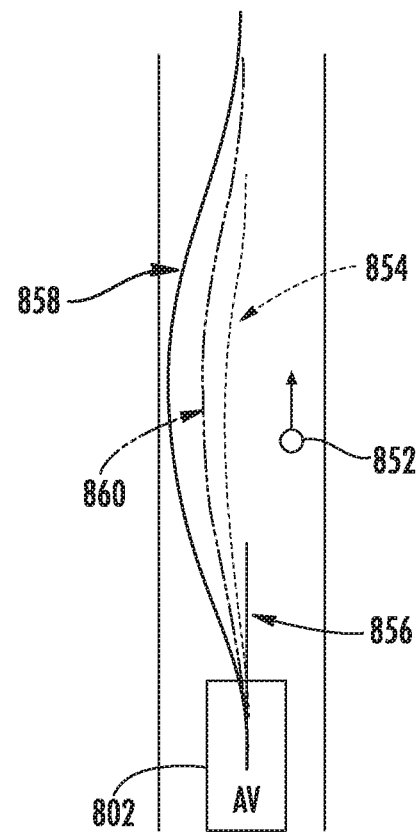
FIG. 8B depicts a graphical representation of a plurality of trajectories near an object according to example embodiments of the present disclosure.

FIG. 8B depicts a graphical representation of a plurality of trajectories 850 near an object according to example embodiments of the present disclosure. The cost for a particular trajectory can be generated based, at least in part, on the spatial relationship between the particular trajectory and the other objects in the environment, including but not limited to other vehicles, buildings, signs, pedestrians, and so on. For example, if the other object is a person on a bicycle 852, the trajectory can be scored such that if an example trajectory passes within a buffer distance, the cost can be high (e.g., based on the increased danger of a collision). Similarly, an example trajectory 854 that leaves the current lane can have a high generated cost (based on a lane boundary penalty). An example trajectory 854 that passes close enough to the bicycle that the speed must be reduced to pass safely may have a cost that is heightened because the autonomous vehicle will travel less distance during the given time frame.

Similarly, if an example trajectory 856 does not swerve around the bicycle 852, the trajectory speed can be limited to the speed of the bicycle 852 so that no collision occurs. Such an example trajectory 856 can have a higher cost value because the autonomous vehicle 802 will travel much less distance than a trajectory that can swerve around the bicycle 852.

In some examples, an example trajectory 858 that leaves the current lane can have a higher cost value due to the lane boundary penalty. An optimal example trajectory 860 can be a trajectory that veers around the bicycle 852 far enough so that it does not have to slow its speed but not so far that it leaves the current lane.

Figure 9:
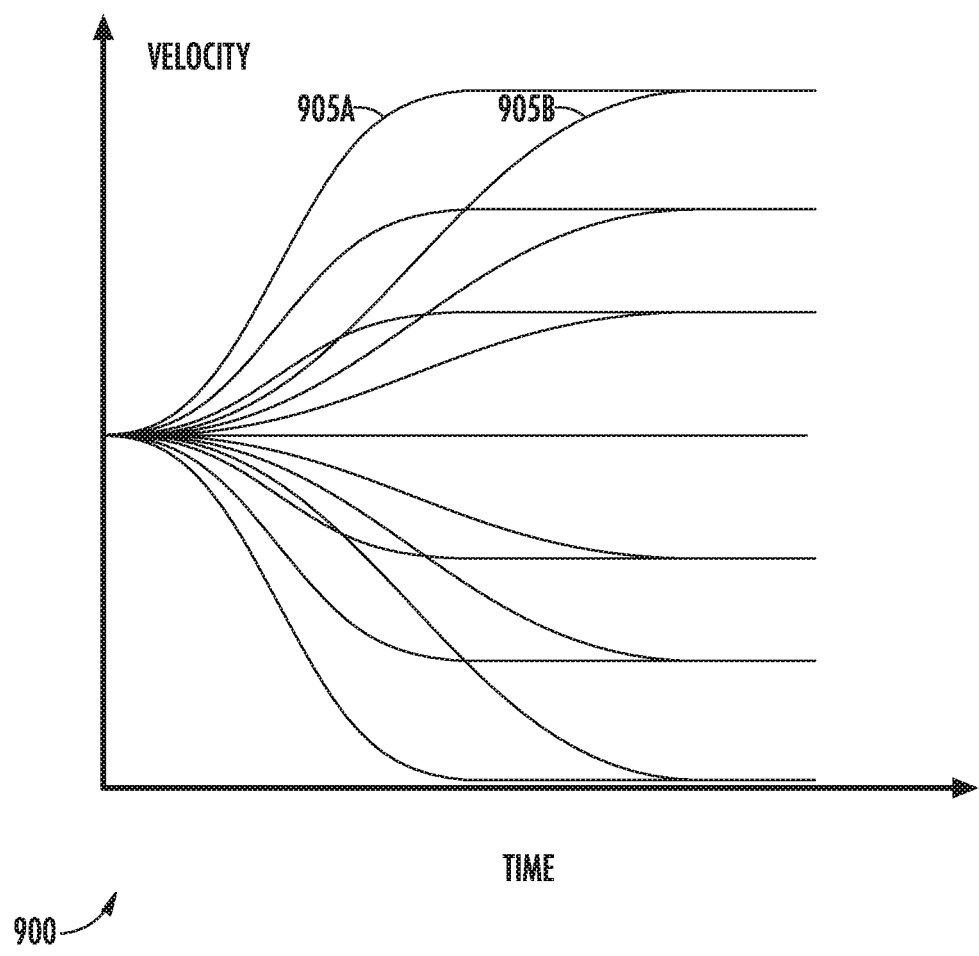
FIG. 9 depicts a graphical representation of a plurality of velocity profiles according to example embodiments of the present disclosure.

FIG. 9 depicts a graphical representation of a plurality of velocity profiles 900 according to example embodiments of the present disclosure. As with the offset profiles, the velocity profiles 900 can represent a plurality of variations of potential speeds, which are plotted on time, such that a variety of different speeds can be reached at a variety of times. For example, velocity profile 905A has a velocity that increases quickly early in the graph, representing a velocity that increases quickly in time and maintains a constant speed. Velocity profile 905B represents a profile in which the velocity increases less rapidly but still reaches the same final velocity.

Figure 10B:
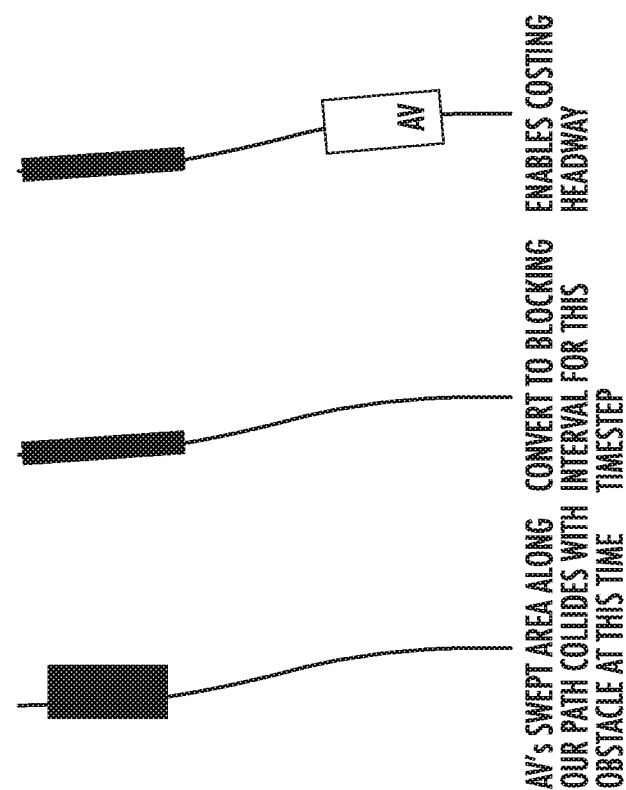
FIG. 10B depicts representations of the blocking interval computation at different timesteps according to example embodiments of the present disclosure.
Figure 10A:
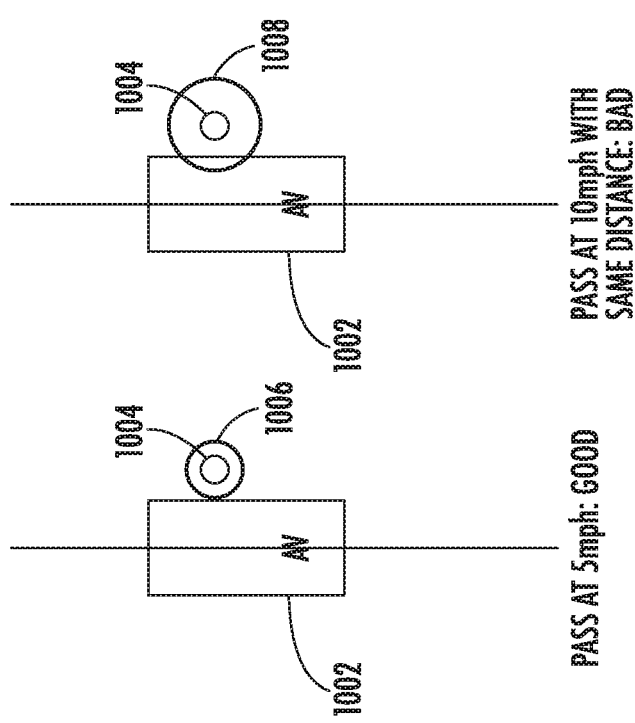
FIG. 10A depicts representations of a buffer distance associated with an object according to example embodiments of the present disclosure.

FIG. 10A depicts representations of a buffer distance associated with an object according to example embodiments of the present disclosure. In some examples, the motion planning system (e.g., motion planning system 202 in FIG. 2) can determine a buffer distance that an autonomous vehicle 1002 maintains from other objects 1004 that are detected. In some examples, the buffer distance can be determined based on the speed of the autonomous vehicle 1002. For example, if the autonomous vehicle is traveling at a relatively slow speed (e.g., 5 mph), the buffer distance 1006 from the other object 1004 can be relatively small. The relative buffer distance can be determined based on a predefined algorithm that determines a buffer distance based on the speed of the autonomous vehicle, the object to be passed, the type of travel way, the number of lanes available, and so on. Alternatively, the buffer distance can be determined by a machine-learned model, trained to select a buffer distance that maintains safety while also ensuring that the autonomous vehicle travels quickly. In another example, a series of buffer distances can be precalculated and stored in a database for reference.

Similarly, as the speed of the autonomous vehicle 1002 increased, the buffer distance 1008 can also increase. Thus, a trajectory that is not within a buffer distance at a first speed, may violate the buffer distance if the speed of the autonomous vehicle 1002 is increased.

FIG. 10B depicts representations of the blocking interval computation at different timesteps according to example embodiments of the present disclosure. For example, a given object can cross a projected trajectory at a given timestep. To accurately plan a trajectory that takes the object into account, the system can convert the representation of the object to blocking for the particular timestep. The system can use this blocking conversion for input to one or more cost functions, including but not limited to the headway cost function, the gridlock cost function, and the actor caution cost function. As a result, the blocking conversion can enable accurate selection of an appropriate trajectory.

Figure 11:
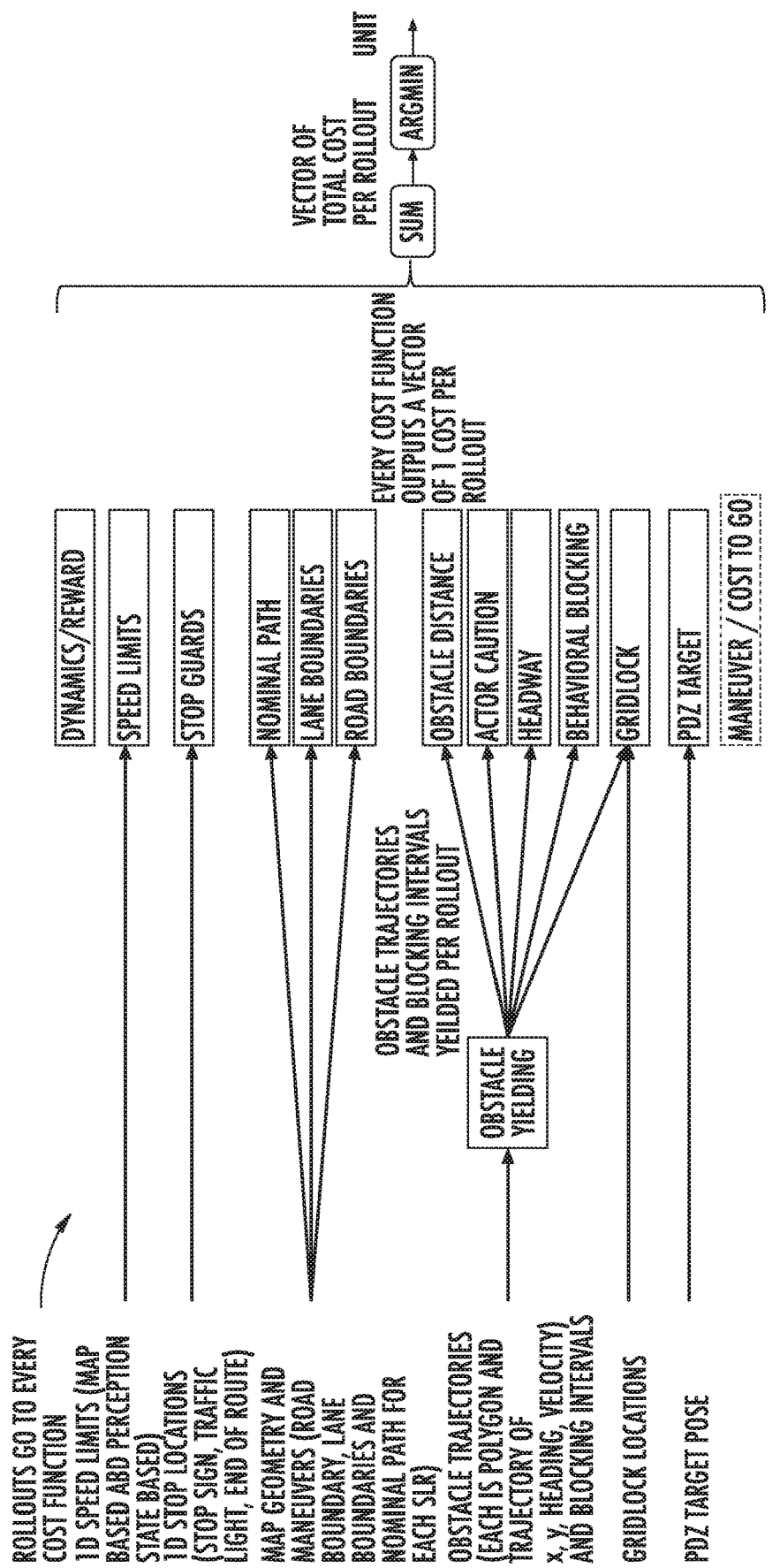
FIG. 11 depicts a graphic depiction of a cost calculation system according to example embodiments of the present disclosure.

FIG. 11 depicts a graphic depiction of a cost calculation system according to example embodiments of the present disclosure. The vehicle computing system can score each trajectory using one or more cost functions to ensure a safe, efficient, and comfortable vehicle motion. The cost functions can be encoded for the avoidance of object collision, for the autonomous vehicle to stay on the travel way/within lane boundaries, prefer gentle accelerations to harsh ones, etc. As further described herein, the cost function(s) can consider vehicle dynamics parameters (e.g., to keep the ride smooth, acceleration, jerk, etc.) and/or map parameters (e.g., speed limits, stops, travel way boundaries, etc.). The cost function(s) can include costs functions for calculating: dynamics costs, collision costs (e.g., cost of avoiding/experiencing potential collision, minimization of speed/or the energy of impact, etc.), overtaking buffer costs (e.g., give 4 ft of space with overtaking a bicycle, etc.), headway costs (e.g., preserve stopping distance when applying adaptive cruise control motion a moving object, etc.), actor caution costs (e.g., preserve the ability to stop for unlikely events, etc.), behavioral blocking costs (e.g., avoid overtaking backed-up traffic in the vehicle's lane, etc.), yielding costs, speed zone costs, stop guard costs, nominal path costs, lane road boundaries costs, gridlock costs, and/or other parameters. In some implementations, the cost function(s) can account for fixed buffer and/or speed dependent buffers (e.g., requiring more space for actors when the vehicle is passing at higher speeds, etc.). As seen above, the cost function(s) can account for map geometry features such as the distance from the initial travel path, the location of lane boundaries, and road boundaries.

The vehicle computing system can score the plurality of different candidate trajectories (each one having a different offset profile and a different velocity profile). The vehicle computing system (e.g., a scoring system of the motion planning system) can generate a score for each candidate trajectory based on the results of the plurality of cost functions. For example, the vehicle computing system can perform an object collision detection cost function to detect whether a trajectory will cause the autonomous vehicle to collide with any objects. This cost function can take, as input, a list of candidate trajectories, each candidate trajectory including a list of points that describe the position (e.g., based on an x, y coordinate plane) of the autonomous vehicle during that trajectory, the heading of the autonomous vehicle, and the velocity of the autonomous vehicle at each timestep for the planning horizon (e.g., eighty 0.1 second time steps for an eight second planning horizon). The vehicle computing system can access sensor data to determine the shape, object type, position, and future path of one or more objects. The path for each object can be represented as a series of points at each timestep (each point including the (x, y) position, the heading, and the velocity of the object), as described herein.

The vehicle computing system can plot the path of the autonomous vehicle represented by a specific trajectory and determine whether the autonomous vehicle will collide with one or more objects while following that particular trajectory. The object collision detection cost function can output, for each candidate trajectory, three values: an indication of whether a collision was predicted, the maximum relative speed during a predicted collision, and any other costs.

If the vehicle computing system determines that the autonomous vehicle will collide with an object while following a particular trajectory, the vehicle computing system (e.g., the scoring system) can generate a cost modifier for that particular trajectory that results in the particular trajectory having an increased cost (and is thus less likely to be selected). In some examples, any predicted collision will result in that trajectory being eliminated from consideration by the motion planning system. In some examples, the vehicle computing system can perform collision checking at each timestep in a plurality of timesteps.

The actor caution cost function can cause the autonomous vehicle to prioritize trajectories that allow the autonomous vehicle to slow such that it preserves the ability to stop when conflicting predictions are possible but unlikely. The actor caution cost function can take, as input, a list of candidate trajectories, a list of object trajectories likelihoods, and/or blocking interval information for each combination of candidate trajectory and likely object trajectory. In this context, the blocking intervals can represent the minimum and maximum odometer value (distance) that would result in a collision with an object. This blocking interval can be based on an along path speed associated with the autonomous vehicle. The actor caution cost function can determine a speed for each candidate trajectory that brings the autonomous vehicle closest to a particular object without causing a collision. Based on the determined speed, the actor caution cost function can output a one-dimensional vector including a cost for each candidate trajectory based on the comparison of the candidate trajectories, the speed limits they must stay under to avoid an unlikely future collision, and the object (obstacle) trajectory likelihoods.

The headway cost function can take, as input, a list of candidate trajectories (including the distance traveled, the velocity, and the acceleration for each timestep), a list of object trajectory likelihoods, and/or blocking interval information for each combination of candidate trajectory and object trajectory. In some examples, the blocking intervals can represent the minimum and maximum odometer value that would result in a collision with an object and the along path speed. The headway cost function can determine, for each time step and each trajectory object trajectory pair, whether the distance traveled is not past the end of the interval. If it is not, the headway cost function can generate a cost headway based on the difference between the odometer and the start of the interval, the velocity of the autonomous vehicle, the acceleration of the autonomous vehicle, and the along track velocity of the object. Thus, the output of the headway cost function is a per trajectory cost.

More specifically, the headway cost function can be intended to maintain a safe follow distance between the autonomous vehicle and a vehicle ahead of the autonomous vehicle. To do so, the path planning system maintains a blocking interval in front of the autonomous vehicle. Trajectories that violate this blocking interval can receive a cost penalty. The headway cost function can further simulate the position of the blocking interval if the leading vehicle were to suddenly brake (with the maximum amount of stopping force) given the current speed and velocity of the vehicle. The headway cost function can then penalize a candidate trajectory if it is going too fast to stop before the unlikely but possible position of the braked blocking interval.

The behavioral blocking cost function can cause the vehicle computing system to increase the cost of candidate route that violate the commonsense rules of the road but are not safety-critical. For example, undesirable behavior can include, but is not limited to, staying close to another vehicle traveling in the same lane, passing backed up traffic in the current lane, remaining in another vehicle's blind spot, and/or staying next to another vehicle turning in the same direction. The behavioral blocking cost function can use, as input, a list of the candidate trajectories (specifically including the longitudinal projection along the nominal path and the acceleration of the autonomous vehicle for each candidate trajectory) and a list of autonomous vehicle trajectory and object trajectory pairs.

The behavioral blocking cost function can generate a cost for each candidate trajectory based on determining whether an object is tracking the same path as the autonomous vehicle, determining whether the autonomous vehicle is blocking the object (a bike or pedestrian might not be behavioral blocking the autonomous vehicle from staying next to it/passing it), the maximum and minimum longitudinal projection along the nominal path, and/or the projected velocity along the nominal path. The behavioral blocking cost function can then determine, for each time step and for each pairing of the autonomous vehicle trajectories and object trajectories, if the distance between the autonomous vehicle and the object is between a particular distance (e.g., within a minimum and maximum distance), a cost can be attributed to the candidate trajectory. The total cost for all time steps and each object can be summed to generate a total cost for the candidate trajectory. In some examples, the cost added can be based on the velocity of the autonomous vehicle such that the autonomous vehicle may not pass a long line of backed-up cars in the lane of the autonomous vehicle. Thus, trajectories that pass too close to other vehicles can have an increased cost that increases the longer the distance is too close. Similar calculations can be used to increase the cost of remaining in a particular area nearby the object such as the object's blind spot or the position directly beside a vehicle in another lane. The behavioral blocking cost function can designate any area relative to an object to have an associated cost and can increase the cost the longer the autonomous vehicle remains in an area having a cost. The behavioral blocking cost function can output a cost value for each candidate trajectory.

In some examples, the behavioral blocking cost function can generate a cost for each candidate trajectory by projecting an object's minimum and maximum distance during a particular time step (based on estimated speed and position of the object) onto the candidate trajectory for each timestep. If the autonomous vehicle is behind that minimum and maximum distance projection, the behavioral blocking cost function can generate a penalty for trajectories that bring the autonomous vehicle within a certain distance of the object (to ensure that the autonomous vehicle has a good following distance). In addition, in this situation the system can limit braking to a certain amount, such that the autonomous vehicle will pass, rather than braking too hard.

The yielding cost function can take, as input, the distance until the autonomous vehicle enters the path of the object (used to estimate the autonomous vehicles estimated time of arrival in the path of the object), the autonomous vehicle's distance along the path of the object when the paths intersect, the velocity of the autonomous vehicle when intersecting with the path of the object, and similar values for when the autonomous vehicle exits the path of the object. The yielding cost function can also modify the predicted path of one or more objects based on predicted mitigating actions of the object. For example, if the yielding cost function determines that another vehicle is likely to yield, the predicted path of that vehicle can be updated to include the likely slowing of the vehicle. In some examples, the yielding cost function can determine the type of interaction (e.g., merging, path crossing, etc.). Based on the positions of the autonomous vehicle and the object as well as the interaction type, the yielding cost function can determine who has priority (or right of way). This determination can be used to up-weight or down-weight the importance of the burden placed on the other object. A cost can be generated for each trajectory based on when, and if, the object (e.g., the other vehicle) is expected to yield based on the input factors. If a large burden is placed on the other object, an increased cost can be generated. The yielding cost function can output a cost for each candidate trajectory.

The speed zone cost function can take, as input, for each candidate trajectory, the speed of the autonomous vehicle at each time step and the coordinates of the autonomous vehicle at each time step. The speed zone cost function can also take, as input, a longitudinal mapping of the speed limit in one-meter increments. The speed zone cost function can determine whether the autonomous vehicle exceeds the speed limit at each time step along the trajectory. The cost for each candidate trajectory can then be based on the number of time steps in which the autonomous vehicle exceeds the speed limit.

The nominal path cost function can generate a small cost based on the degree to which a candidate trajectory departs from the nominal path. The nominal path cost function can take, as input, the offset profile of the candidate trajectory being scored. In this way, the vehicle computing system can have a small preference for trajectories that remain near the nominal path.

The lane boundaries cost function can take, as input, at least the plurality of candidate trajectories (each trajectory including a location at each time step and the heading at each time step) and a lane boundary polygon. The lane boundary cost function can generate a cost based on determining, at each time step, whether the autonomous vehicle has moved outside of the lane boundaries. Thus, a trajectory that leaves the current lane of the autonomous vehicle can have a high cost (e.g., a lane boundary violation cost).

The nominal path cost function can generate a small cost based on the degree to which a candidate trajectory departs from the nominal path. The nominal path cost function can take, as input, the offset profile of the candidate trajectory being scored. In this way, the vehicle computing system can have a small preference for trajectories that remain near the nominal path.

The lane boundaries cost function can take, as input, at least the plurality of candidate trajectories (each trajectory including a location at each time step and the heading at each time step) and a lane boundary polygon. The lane boundary cost function can generate a cost based on determining, at each time step, whether the autonomous vehicle has moved outside of the lane boundaries. Thus, a trajectory that leaves the current lane of the autonomous vehicle can have a high cost (e.g., a lane boundary violation cost).

In some examples, the cost for a particular trajectory is generated based, at least in part, on the degree to which the trajectory follows established criteria for evaluating trajectories. For example, the spot guard cost function can, if the environment includes a stopping point (e.g., a stop sign), assign a high cost to a trajectory that does not stop before the stopping point. Similarly, a trajectory that stops well short of the stop point may be determined to have a high cost. In some examples, a trajectory that stops short may have a relatively high cost due to not receiving a "distance reward" which can reduce the cost of a trajectory.

A gridlock cost function can take, as input, a list of candidate trajectories. Each candidate trajectory can include information for the last timestep in the trajectory such as the distance traveled during the candidate trajectory and the longitudinal coordinate in the last timestep. Additionally, the gridlock cost function can take, as input, a list of object trajectories, object types, and blocking intervals for each pair of a trajectory and an object trajectory. The blocking intervals can be a maximum and minimum odometer value (along the trajectory) that would result in a collision. The blocking interval can also include a path speed. The gridlock cost function can determine, based on the last time step, whether the autonomous vehicle's longitudinal coordinate is within the (min, max) of the gridlock interval, the object is nearly stopped (<1mps), and the blocking interval is ahead of the autonomous vehicle but before the end of the gridlock region. If so, the gridlock cost function can assign a fixed cost to this rollout for the trajectory.

The vehicle computing system (e.g., vehicle computing system 112 of FIG. 1) can score the plurality of different trajectories (each one having a different offset profile and a different velocity profile). The vehicle computing system (e.g., a scoring system of the motion planning system) can generate a score for each candidate trajectory based on several factors. For example, the vehicle computing system can perform object collision detection to detect whether a trajectory will cause the autonomous vehicle to collide with any objects. The vehicle computing system can access sensor data to determine the position and future path of one or more objects, as described herein. The vehicle computing system can plot the path of the autonomous vehicle represented by a specific trajectory and determine whether the autonomous vehicle will collide with one or more objects while following that particular trajectory.

Figure 12:
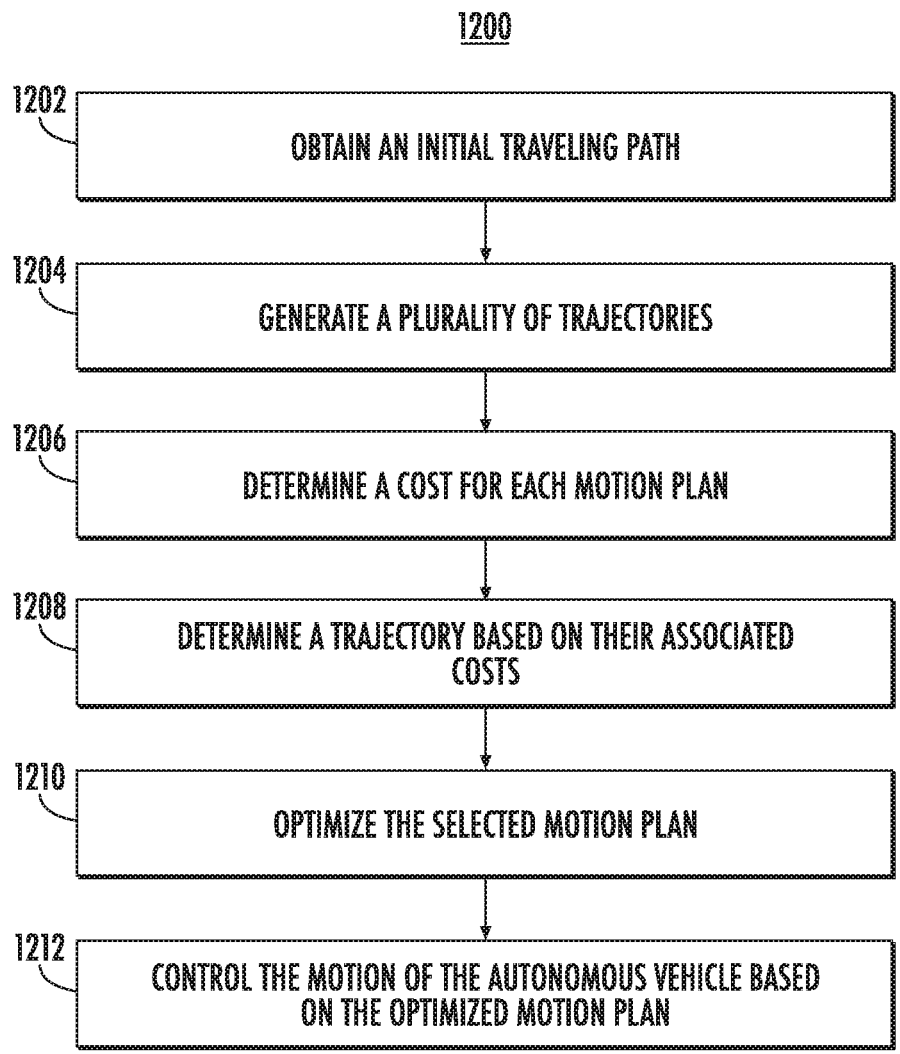
FIG. 12 depicts a flow chart diagram of an example method according to example embodiments of the present disclosure.

FIG. 12 depicts a flow chart diagram of an example method according to example embodiments of the present disclosure. A vehicle computing system (e.g., vehicle computing system 112 of FIG. 1) can obtain, at 1202, an initial travel path for an autonomous vehicle from a first location to a second location. In some examples, the initial travel path represents an ideal path from the first position to the second position that is determined prior to consideration of the one or more objects.

A vehicle computing system (e.g., vehicle computing system 112 of FIG. 1) can obtain, at 1204, sensor data describing one or more objects within an environment of the autonomous vehicle, wherein the one or more objects are positioned along the initial travel path. In some examples, the one or more objects along the initial travel path comprise objects that at least partially overlap the initial travel path or are within a threshold distance to the initial travel path.

In some examples, the computing system (e.g., vehicle computing system 112 of FIG. 1) can generate a basis path from the autonomous vehicle's current location to a point along the initial travel path. The basis path can then be used to generate the plurality of candidate trajectories, rather than the initial travel path.

A vehicle computing system (e.g., vehicle computing system 112 of FIG. 1) can generate a plurality of trajectories for the autonomous vehicle based, at least in part, on the sensor data and the initial travel path. As noted above, the vehicle computing system can ensure that the trajectories are planned by a flat system (e.g., a differentially flat system). In some examples, trajectories planned by a flat system are guaranteed to be flat outcomes (e.g., they preserve flatness). In some examples, preserving flatness ensures that any point on the selected trajectory can be reliably reached based on input to the vehicle control system. In some examples, the vehicle computing system can ensure that all generated trajectories preserve the flatness property such that regardless of which candidate trajectory is selected, the flatness property will be maintained. Thus, each trajectory generated by the vehicle computing system can be reached based on specific inputs to the vehicle control system.

Generating a respective trajectory can include one or more steps. For example, the vehicle computing system (e.g., vehicle computing system 112 of FIG. 1) can determine, at 1206, a velocity profile for the autonomous vehicle based, at least in part, on the one or more objects. In some examples, the velocity profile includes one or more acceleration values and, for each acceleration value, associated timing information.

In some examples, the vehicle computing system can (e.g., vehicle computing system 112 of FIG. 1) determine an offset profile for the autonomous vehicle based, at least in part, on the one or more objects, wherein the offset profile includes a plurality of lateral offset values, each lateral offset value represents a direction and distance of offset from the initial travel path at a point along the initial travel path. In some examples, the offset values for the offset profile are constrained within a predetermined limit.

In some examples, the vehicle computing system can (e.g., vehicle computing system 112 of FIG. 1) can determine whether the initial travel path, the offset profile, and a velocity profile each meet one or more flatness criteria. One flatness criteria that can be measured is to determine whether the candidate trajectory (e.g., the initial travel path, the offset profile, and a velocity profile) can be mapped to specific vehicle controls such that the actual trajectory of the autonomous vehicle matches the planned candidate trajectory. To measure this, the initial travel path, the offset profile, and a velocity profile can be analyzed to ensure that they stay within one or more predetermined bounds (e.g., are bounded).

To do so, the vehicle computing system can (e.g., vehicle computing system 112 of FIG. 1) can, for each of the initial travel path, the offset profile, and the speed profile, access a corresponding polynomial. The vehicle computing system can (e.g., vehicle computing system 112 of FIG. 1) calculate one or more derivatives for the corresponding polynomials (e.g., a third, fourth, or fifth order derivative) that can represent the velocity, acceleration, and jerk of the autonomous vehicle. The vehicle computing system can (e.g., vehicle computing system 112 of FIG. 1) can ensure that the initial travel path, the offset profile, and the speed profile do not exceed predefined boundaries for one or more of velocity, acceleration, and jerk based on the calculated derivatives. If the initial travel path, the offset profile, and a velocity profile do not exceed the predetermined boundaries for each of velocity, acceleration, and jerk, they can be said to meet the one or more flatness criteria.

In response to determining that the initial travel path, the offset profile, and the velocity profile each meet the one or more flatness criteria, the vehicle computing system can (e.g., vehicle computing system 112 of FIG. 1) can combine the initial travel path, the offset profile, and the velocity profile into the respective trajectory. Because each component was verified to fulfill certain criteria, the candidate trajectory that is generated by combining them will also meet the criteria.

In some examples, the vehicle computing system (e.g., vehicle computing system 112 of FIG. 1) can determine a trajectory from the plurality of trajectories. The vehicle computing system (e.g., vehicle computing system 112 of FIG. 1) can determine, at 1206, a cost for each respective trajectory of the plurality of trajectories based, at least in part, on the obtained sensor data. In some examples, determining the cost for each respective trajectory in the plurality of trajectories can include identifying the one or more objects within the environment of the autonomous vehicle. The vehicle computing system can determine a position for each object of the one or more objects.

The vehicle computing system (e.g., vehicle computing system 112 of FIG. 1) can, for a respective trajectory in the plurality of trajectories, calculate, based on the offset profile for the respective trajectory and the position for each object in the one or more objects, whether the autonomous vehicle will collide with the one or more objects while following the initial travel path modified by the lateral offset values included in the offset profile for the respective trajectory.

The vehicle computing system (e.g., vehicle computing system 112 of FIG. 1) can determine whether a respective object in the one or more objects is in motion. In response to determining that the respective object is in motion, the vehicle computing system (e.g., vehicle computing system 112 of FIG. 1) can determine an object path for the respective object. The vehicle computing system (e.g., vehicle computing system 112 of FIG. 1) can compare the object path for the respective object with the initial travel path modified by the lateral offset values included in the offset profile for the respective trajectory to determine whether the autonomous vehicle will collide with the object while traveling in accordance with the trajectory.

In some examples, the vehicle computing system (e.g., vehicle computing system 112 of FIG. 1) can adjust the cost for the respective trajectory based on whether the autonomous vehicle will collide with the one or more objects while following the initial travel path modified by the lateral offset values included in the offset profile for the respective trajectory. In some examples, the trajectory is determined from the plurality of trajectories based, at least in part, on the cost for the trajectory. In some examples, the cost for a respective trajectory is based, at least in part, on the offset values for the offset profile. In some examples, the cost associated with a respective trajectory is based, at least in part, on the velocity profile for the respective trajectory.

In some examples, the vehicle computing system (e.g., vehicle computing system 112 of FIG. 1) can identify the one or more objects within the environment of the autonomous vehicle. The vehicle computing system (e.g., vehicle computing system 112 of FIG. 1) can determine a position for each object of the one or more objects. The vehicle computing system (e.g., vehicle computing system 112 of FIG. 1) can, for a respective trajectory in the plurality of trajectories, determine whether the autonomous vehicle passes within a buffer distance of an object while following the initial travel path modified by the lateral offset values included in the offset profile for the respective trajectory. The vehicle computing system (e.g., vehicle computing system 112 of FIG. 1) can determine the cost for each respective trajectory based, at least in part, on determining whether the autonomous vehicle passes within the buffer distance of the object while following the initial travel path modified by the lateral offset values included in the offset profile for the respective trajectory.

In some examples, the buffer distance is a predetermined fixed distance. Determining whether the autonomous vehicle passes within the buffer distance of the object can include the vehicle computing system (e.g., vehicle computing system 112 of FIG. 1) determining an object type associated with the object and determining a buffer distance based, at least in part, on the object type. In some examples, the buffer distance varies based, at least in part, on a speed at which the autonomous vehicle is traveling.

In some examples, the vehicle computing system (e.g., vehicle computing system 112 of FIG. 1) can identify one or more actors in the environment of the autonomous vehicle. The vehicle computing system (e.g., vehicle computing system 112 of FIG. 1) can determine a position for each actor of the one or more actors. For a respective trajectory in the plurality of trajectories, the vehicle computing system (e.g., vehicle computing system 112 of FIG. 1) can determine the cost for the respective trajectory based, at least in part, on whether the respective trajectory induces a burden on an actor of the one or more actors.

The vehicle computing system (e.g., vehicle computing system 112 of FIG. 1) can optimize, at 1210 the determined trajectory to produce an optimized trajectory. In some examples, the vehicle computing system can control, at 1212, the motion of the autonomous vehicle based, at least in part, on the trajectory. In some examples, the system for generating a plurality of trajectories is a flat system and the selected trajectory is a flat output.

Figure 13:
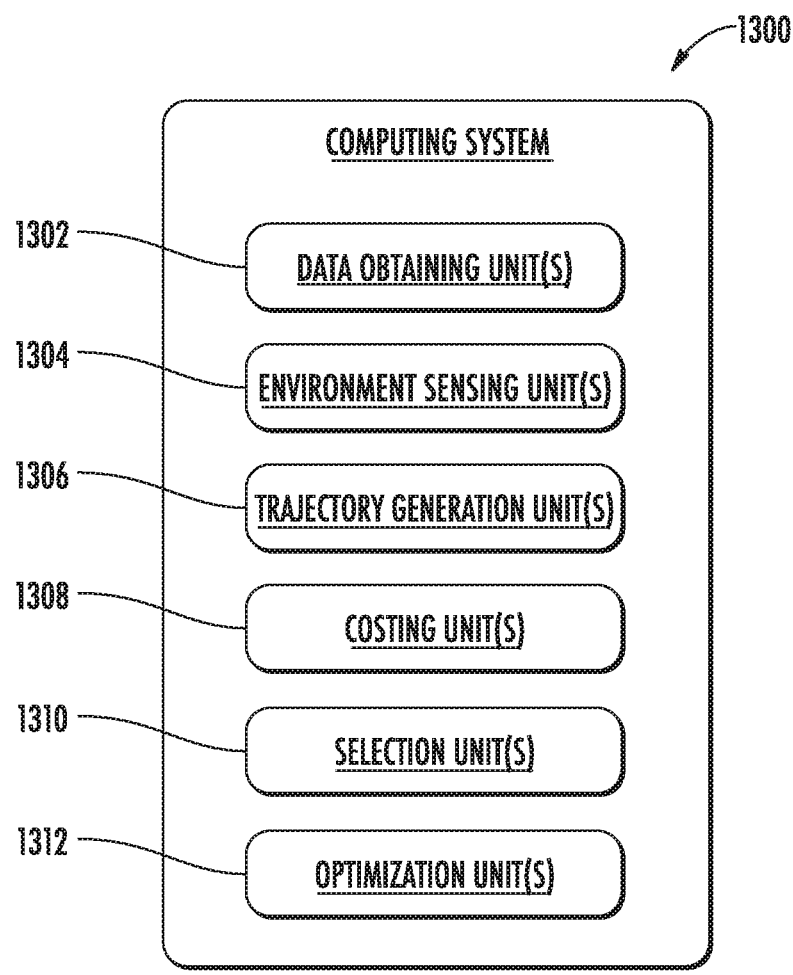
FIG. 13 depicts an example system with units for performing operations and functions according to example aspects of the present disclosure.

FIG. 13 depicts an example system 1300 with units for performing operations and functions according to example aspects of the present disclosure. Various means can be configured to perform the methods and processes described herein. For example, a computing system can include data obtaining unit(s) 1302, environment sensing unit(s) 1304, trajectory generation unit(s) 1306, costing unit(s) 1308, selection unit(s) 1310, optimization unit(s) 1312, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain an initial travel path for an autonomous vehicle from a first location to a second location. For example, the computing system can access initial travel path data from a repository so such data, either locally or remotely. A data obtaining unit 1302 is one example of a means for obtaining an initial travel path for an autonomous vehicle from a first location to a second location.

The means can be configured to obtain sensor data describing one or more objects within an environment of the autonomous vehicle, wherein the one or more objects are positioned along the initial travel path. For example, an autonomous vehicle can include one more camera(s), a LIDAR system, and a RADAR system to detect objects in the environment of the autonomous vehicle. An environment sensing unit 1304 is one example of a means for obtaining sensor data describing one or more objects within an environment of the autonomous vehicle.

The means can be configured to generate a plurality of trajectories for the autonomous vehicle based, at least in part, on the sensor data and the initial travel path. For example, the plurality of trajectories represent potential paths from the current location to the destination location. A trajectory generation unit 1306 is one example of a means for generating a plurality of trajectories for the autonomous vehicle based, at least in part, on the sensor data and the initial travel path.

The means can be configured to determine a cost for each respective trajectory in the plurality of trajectories based, at least in part, on the obtained sensor data. For example, each trajectory can be evaluated on a variety of metrics, including but not limited to, the likelihood of colliding with an object, the speed of the trajectory, the degree to which the trajectory stays in the appropriate lane, and so on. A costing unit is one example of a means for determining a cost for each respective trajectory in the plurality of trajectories based, at least in part, on the obtained sensor data.

The means can be configured to select a trajectory based on the determined costs for each respective trajectory in the plurality of trajectories. For example, the vehicle computing system (e.g., vehicle computing system 112 of FIG. 1) can select the trajectory with the lowest total cost. A selection unit is one example of a means for selecting a trajectory based on the determined costs for each respective trajectory in the plurality of trajectories.

The means can be configured to optimize the selected trajectory to produce an optimized trajectory. For example, the trajectory can be optimized to reduce the amount of acceleration of the autonomous vehicle during the trajectory to make the ride smoother. An optimization unit is one example of a means for optimizing the selected trajectory to produce an optimized trajectory.

Figure 14:
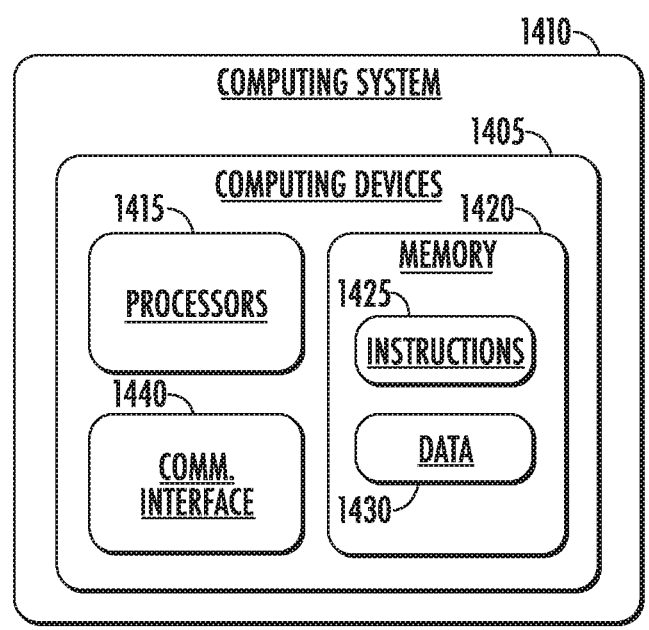
FIG. 14 depicts example system components according to example aspects of the present disclosure.

FIG. 14 depicts example system components according to example aspects of the present disclosure. The example system 1400 illustrated in FIG. 14 is provided as an example only. The components, systems, connections, and/or other aspects illustrated in FIG. 14 are optional and are provided as examples of what is possible, but not required, to implement the present disclosure. The computing system 1400 can be and/or include the vehicle computing system 100 of FIG. 1. The computing system 1400 can be associated with a central operations system and/or an entity associated with the vehicle 105 such as, for example, a vehicle owner, vehicle manager, fleet operator, service provider, etc.

The computing device(s) 1405 of the computing system 1400 can include processor(s) 1415 and at least one memory 1420. The one or more processors 1415 can be any suitable processing device (e.g., a processor core, a microprocessor, an ASIC, an FPGA, a controller, a microcontroller, etc.) and can be one processor or a plurality of processors that are operatively connected. The memory 1420 can include one or more non-transitory computer-readable storage media, such as RAM, ROM, EEPROM, EPROM, one or more memory devices, flash memory devices, magnetic disks, data registers, etc., and combinations thereof.

The memory 1420 can store information that can be accessed by the one or more processors 1415. For instance, the memory 1420 (e.g., one or more non-transitory computer-readable storage mediums, memory devices) can include computer-readable instructions 806 that can be executed by the one or more processors 1415. The instructions 1425 can be software written in any suitable programming language or can be implemented in hardware. Additionally, or alternatively, the instructions 1425 can be executed in logically and/or virtually separate threads on processor(s) 1415

For example, the memory 1420 on-board the vehicle 105 can store instructions 1425 that when executed by the one or more processors 1415 cause the one or more processors 1415 (e.g., in the vehicle computing system 100) to perform operations such as any of the operations and functions of the computing device(s) 1405 and/or vehicle computing system 100, any of the operations and functions for which the vehicle computing system 100 is configured, and/or any other operations and functions described herein.

The memory 1420 can store data 1430 that can be obtained (e.g., received, accessed, written, manipulated, created, generated, etc.) and/or stored. The data 1430 can include, for instance, services data (e.g., trip data, route data, user data, etc.), sensor data, map data, perception data, prediction data, motion planning data, object states and/or state data, object motion trajectories, and/or other data/ information as described herein. In some implementations, the computing device(s) 1405 can obtain data from one or more memories that are remote from the autonomous vehicle 105.

The computing device(s) 1405 can also include a communication interface 1440 used to communicate with one or more other system(s) (e.g., the remote computing system). The communication interface 1440 can include any circuits, components, software, etc. for communicating via one or more networks (e.g., network(s)). In some implementations, the communication interface 1440 can include, for example, one or more of a communications controller, a receiver, a transceiver, a transmitter, a port, conductors, software, and/or hardware for communicating data.

Figure 15:
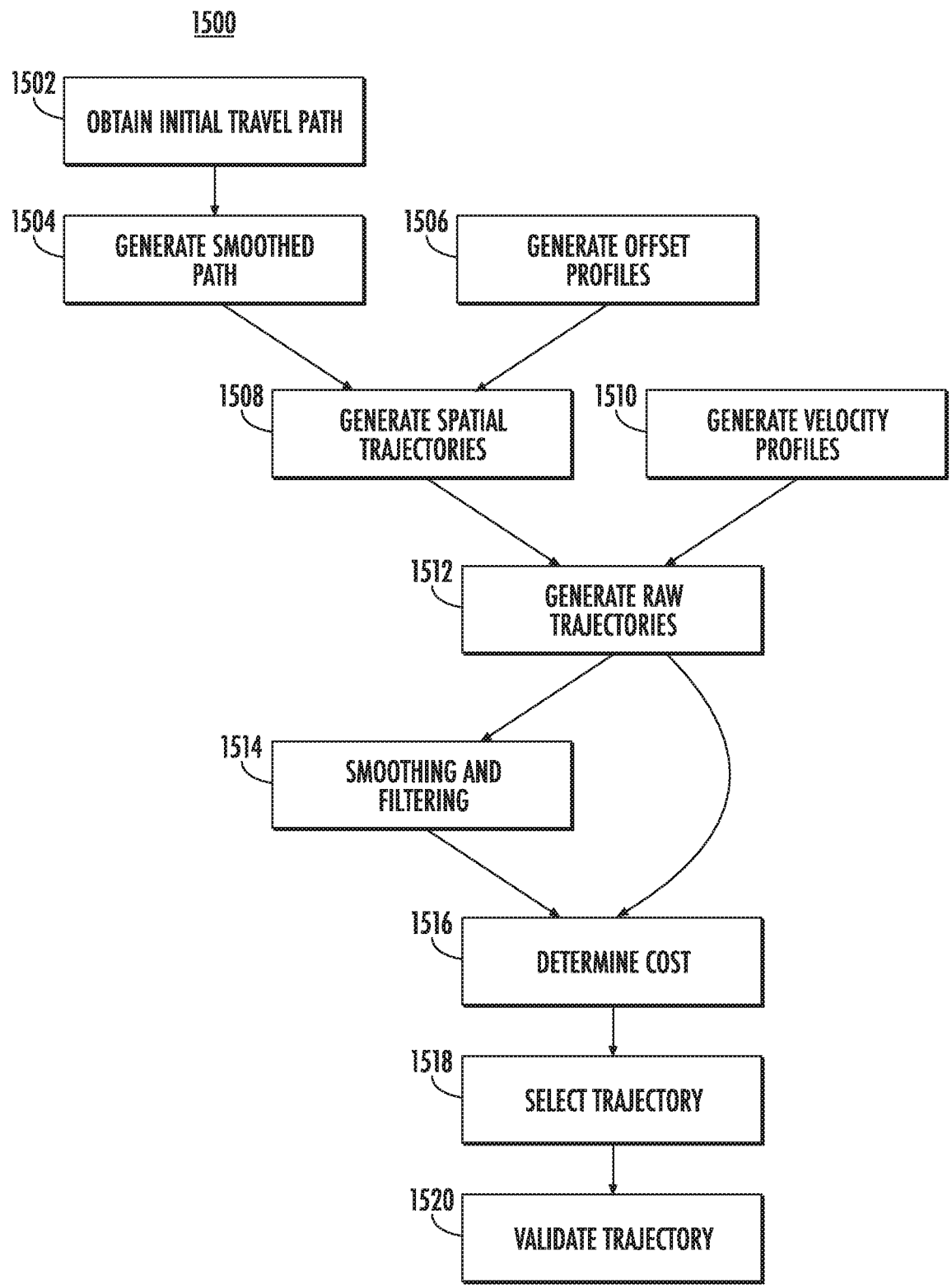
FIG. 15 depicts a flow chart diagram of an example control method based on differential flatness according to example aspects of the present disclosure.

FIG. 15 depicts a flow chart diagram of an example control method 1500 based on differential flatness according to example aspects of the present disclosure. One or more portions of method 1500 can be implemented by one or more computing devices such as, for example, a vehicle computing system 112 as depicted in FIG. 1, and/or computing system 1410 depicted in FIG. 14. One or more portions of the method 1500 described herein can be implemented as an algorithm on the hardware components of the devices described herein (e.g., as in FIG. 1 or FIG. 14) to, for example, to generate optimal trajectories in accordance with a particular travel path. Although FIG. 15 depicts steps performed in a particular order for purposes of illustration and discussion, method 1500 of FIG. 15 is not limited to the particularly illustrated order or arrangement. The various steps of the methods disclosed herein can be omitted, rearranged, combined, and/or adapted in various ways without deviating from the scope of the present disclosure.

A vehicle computing system (e.g., vehicle computing system 112 of FIG. 1) can obtain, at 1502, an initial travel path for an autonomous vehicle from a first location to a second location. As noted above, the initial travel path can represent the ideal travel path from the first location to a second location without considering any potential obstacles or any considerations.

The vehicle computing system (e.g., vehicle computing system 112 of FIG. 1) can generate, at 1504, a smoothed path. A smoothed path (or basis path) can be generated by an optimizer which can minimize the jerk and wrench expected along the path. To do so, the vehicle computing system (e.g., vehicle computing system 112 of FIG. 1) can produce a twist continuous (or $C^3$ continuous) spatial temporary trajectory.

The vehicle computing system (e.g., vehicle computing system 112 of FIG. 1) can generate, at 1506, a plurality of offset profiles. Each of the offset profiles represents a series of offsets, each offset representing a degree and direction of the offset from the smoothed basis path. More specifically, offset profiles use piecewise seventh polynomials. Quintic (fifth) polynomials can only ensure up to c2 smoothness or curvature continuous and C3 continuous or twist continuous can be required to accurately control wrench. Thus, piecewise seventh polynomials can be used to ensure $p(s)=a(s-s_0)^7+b(s-s_0)^6+c(s-s_0)^5+d(s-s_0)^4+e(s-s_0)^3+f(s-s_0)^2+g(s-s_0)=h$ for $s\in\lfloor s_0(i), s_f(i))$ Where p is the lateral offset and s is the distance along a spatial path. To help ensure $C^3$ continuously long the spatial path, the following connection conditions are available for satisfaction:

$$p(s_f(i-1))=p(s_0(i))$$

$$\dot{p}(s_f(i-1))=\dot{p}(s_0(i))$$

$$\ddot{p}(s_f(i-1))=\ddot{p}(s_0(i))$$

$$\dddot{p}(s_f(i-1))=\dddot{p}(s_0(i))$$

Using the spatial temporary trajectory, the vehicle computing system (e.g., vehicle computing system 112 of FIG. 1) can convert (or generate), at 1508 the smoothed path into a spatial path. For flat control (e.g., controlling the autonomous vehicle such that flatness is preserved), the vehicle computing system (e.g., vehicle computing system 112 of FIG. 1) can generate position, speed, acceleration, curvature, spatial twist, and wrench. The system can use the following formulas to calculate spatial twist and wrench:

Let. $\Delta\theta := \theta_x - \theta_r$ denotes the error between the yaw angle of the Lams path point, $\theta_r$, and that of lateral rollout point, $\theta_x$.

Knowing d', the first derivative of the lateral offset d, and $k_r$, the curvature of the basis path point, the yaw angle error, $\Delta\theta$, is given by:

$$\Delta\theta = \mathrm{atan}\left(\frac{d'}{1 - k_r d}\right)$$

The curvature of the rollout path point is given by:

$$k_x = k_r\left(\frac{\cos(\Delta\theta)}{1 - k_r d} + \frac{d'\cos^3(\Delta\theta)\tan(\Delta\theta)}{(1 - k_r d)^2}\right) + \frac{dw_r \cos^3(\Delta\theta)\tan(\Delta\theta)}{(1 - k_r d)^2} + \frac{d''\cos^3(\Delta\theta)}{(1 - k_r d)^2}$$

where $w_r$ is the spatial twist of the basis path.

The spatial twist and wrench of the rollout path point can be derived by differentiating the curvature the distance along the rollout path, $s_x$.

$$w_x = \frac{d}{ds_x}k_x$$

$$\xi_x = \frac{d^2}{ds_x^2}k_x$$

$$\frac{d}{ds_x} = \frac{d}{ds_r}\frac{ds_r}{ds_x} = \frac{\cos(\Delta\theta)}{1 - k_r d}\frac{d}{ds_r}$$

The vehicle computing system (e.g., vehicle computing system 112 of FIG. 1) can generate, at 1510, a plurality of velocity profiles. The velocity profiles can include piecewise quintic (5th) polynomials to ensure up to acceleration continuous or $c^2$ smoothness in the whole plan horizon as seen below.

$$s(t) = a(t-t_0)^5 + b(t-t_0)^4 + c(t-t_0)^3 + d(t-t_0)^2 + e(t-t_0) + f$$
for $t \in [t_0(i), t_f(i))$ where s is the distance along the spatial path. To ensure $C^2$ continuously along the spatial path, the following connection conditions need to be satisfied:

$$s(t_f(i-1)) = s(t_0(i))$$

$$\dot{s}(t_f(i-1)) = \dot{s}(t_0(i))$$

$$\ddot{s}(t_f(i-1)) = \ddot{s}(t_0(i))$$

In some examples, the velocity profiles can represent the position of an autonomous vehicle as a function of time in the form of piecewise quintic polynomials. To determine a cost for a particular trajectory, the velocity computing system (e.g., vehicle computing system 112 of FIG. 1) can uniformly sample in time, s(i*dt), where dt is the time step used. To resample, the vehicle computing system (e.g., vehicle computing system 112 of FIG. 1) can interpolate a spatial point at position s(i*dt).

The vehicle computing system (e.g., vehicle computing system 112 of FIG. 1) can generate, at 1512, a plurality of raw trajectories. More specifically, the vehicle computing system (e.g., vehicle computing system 112 of FIG. 1), using a spatial path and a velocity profile, can generate a trajectory with one or more computed steering properties, such as the first and second derivative of curvature, the steering angle, the steering angle velocity, the angular velocity, the lateral speed, the lateral acceleration, the lateral jerk, the derivatives with respect to arc length, and so on.

Having a spatial point and its corresponding velocity profile, the vehicle computing system (e.g., vehicle computing system 112 of FIG. 1) can calculate a corresponding temporal twist and wrench be calculated. In some examples, the spatial twist and wrench may lose precision when the autonomous vehicle's speed is close to zero (e.g., the calculated twist is lower than its true value) as shown below:

$$w_x(t)v_x(t) = \frac{w_r(s)}{v_r(s) + \epsilon}v_x(t) < \frac{w_r(s)}{v_r(s)}v_x(t)$$

However, this loss of precision may only happen at the beginning of the smoothed path. When the vehicle computing system (e.g., vehicle computing system 112 of FIG. 1) generates the velocity profiles, the system can ensure the twist is continuous after projection. As a result, the vehicle computing system (e.g., vehicle computing system 112 of FIG. 1) can use the immutable end twist to replace the calculated twist for all candidate trajectories.

In some examples, the vehicle computing system (e.g., vehicle computing system 112 of FIG. 1) can smooth and filter, at 1514, the plurality of trajectories such that the jerk and acceleration expected to be experienced by the autonomous vehicle (or a passenger therein) in the plurality of trajectories are reduced. The vehicle computing system (e.g., vehicle computing system 112 of FIG. 1) can select, at 1518, a trajectory from the plurality of candidate trajectories. The vehicle computing system (e.g., vehicle computing system 112 of FIG. 1) can validate, at 1520, the selected trajectory to ensure that it meets one or more safety standards.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method, comprising:
obtaining an initial travel path for an autonomous vehicle from a first location to a second location;
obtaining sensor data describing one or more objects within an environment of the autonomous vehicle, wherein the one or more objects are positioned along the initial travel path;
generating a plurality of trajectories for the autonomous vehicle based, at least in part, on the sensor data and the initial travel path, wherein generating a respective trajectory comprises:
   determining a velocity profile for the autonomous vehicle;
   determining an offset profile for the autonomous vehicle, wherein the offset profile includes a plurality of lateral offset values respectively representing direction and distance of offsets from the initial travel path at respective points along the initial travel path;
   determining whether at least one of the initial travel path, the offset profile, or the velocity profile meet one or more flatness criteria; and
   in response to determining that at least one of the initial travel path, the offset profile, or the velocity profile meet the one or more flatness criteria, combining the initial travel path, the offset profile, and the velocity profile into the respective trajectory;
determining a trajectory from the plurality of trajectories; and
controlling motion of the autonomous vehicle based, at least in part, on the determined trajectory.

2. The computer-implemented method of claim 1, further comprising:
generating a cost associated with at least one trajectory in the plurality of trajectories.

3. The computer-implemented method of claim 2, wherein generating the cost comprises:
generating a plurality of sub-cost values for the at least one trajectory by an associated cost function; and
combining the plurality of sub-cost values into the cost.

4. The computer-implemented method of claim 3, wherein the trajectory is determined from the plurality of trajectories based, at least in part, on the cost.

5. The computer-implemented method of claim 3, wherein the plurality of sub-cost values are combined at least in part based on a plurality of associated weights respectively associated with the plurality of sub-cost values.

6. The computer-implemented method of claim 2, wherein determining the cost comprises:
identifying the one or more objects within the environment of the autonomous vehicle;
determining a position for at least one object of the one or more objects; and
for the at least one trajectory:
   calculating based on the offset profile for the at least one trajectory and the position for the at least one object, whether the autonomous vehicle is predicted to collide with the at least one object while following the initial travel path modified by the lateral offset values included in the offset profile for the at least one trajectory; and
   adjusting the cost based on whether the autonomous vehicle will is predicted to collide with the at least one object while following the initial travel path modified by the lateral offset values included in the offset profile for the at least one trajectory.

7. The computer-implemented method of claim 6, wherein calculating whether the autonomous vehicle is predicted to collide with the one or more objects while performing the at least one trajectory further comprises:
determining whether a respective object in the one or more objects is in motion;
in response to determining that the respective object is in motion, determining an object path for the respective object; and
comparing the object path for the respective object with the initial travel path modified by the lateral offset values included in the offset profile for the at least one trajectory to determine whether the autonomous vehicle is predicted to collide with the object while traveling in accordance with the at least one trajectory.

8. The computer-implemented method of claim 1, wherein the initial travel path represents an ideal path from the first location to the second location that is determined prior to consideration of the one or more objects.

9. The computer-implemented method of claim 1, wherein the velocity profile includes one or more acceleration values and associated timing information.

10. The computer-implemented method of claim 1, wherein the one or more objects along the initial travel path comprise objects that at least partially overlap the initial travel path or are within a threshold distance to the initial travel path.

11. The computer-implemented method of claim 1, wherein the lateral offset values for the offset profile are constrained within a predetermined limit.

12. The computer-implemented method of claim 2, wherein the cost is based, at least in part, on the lateral offset values for the offset profile for the at least one trajectory.

13. The computer-implemented method of claim 2, wherein the cost is based, at least in part, on the velocity profile for the at least one respective trajectory.

14. The computer-implemented method of claim 2, wherein determining the cost comprises:
identifying the one or more objects within the environment of the autonomous vehicle;
determining a position for at least one object of the one or more objects; and
for the at least one trajectory:
   determining whether the autonomous vehicle passes within a buffer distance of an object while following the initial travel path modified by the lateral offset values included in the offset profile for the at least one trajectory; and
   determining the cost based, at least in part, on determining whether the autonomous vehicle passes within the buffer distance of the object while following the initial travel path modified by the lateral offset values included in the offset profile for the at least one trajectory.

15. The computer-implemented method of claim 14, wherein the buffer distance is a predetermined fixed distance.

16. The computer-implemented method of claim 14, wherein determining whether the autonomous vehicle passes within the buffer distance of the object further comprises:

determining an object type associated with the object; and
determining the buffer distance based, at least in part, on the object type.

17. The computer-implemented method of claim 14, wherein the buffer distance varies based, at least in part, on a speed at which the autonomous vehicle is traveling.

18. The computer-implemented method of claim 2, wherein determining the cost comprises:
    identifying one or more actors in the environment of the autonomous vehicle;
    determining a position for at least one actor of the one or more actors; and
    for the at least one trajectory:
        determining the cost based, at least in part, on whether the at least one trajectory induces a burden on an actor of the one or more actors.

19. A computing system comprising:
    one or more processors; and
    one or more tangible, non-transitory, computer readable media that store instructions that when executed by the one or more processors cause the computing system to perform operations comprising:
        obtaining an initial travel path for an autonomous vehicle from a first location to a second location;
        obtaining sensor data describing one or more objects within an environment of the autonomous vehicle, wherein the one or more objects are positioned along the initial travel path;
        generating a plurality of trajectories for the autonomous vehicle based, at least in part, on the sensor data and the initial travel path, wherein generating a respective trajectory comprises:
            determining a velocity profile for the autonomous vehicle based, at least in part, on the one or more objects;
            determining an offset profile for the autonomous vehicle based, at least in part, on the one or more objects, wherein the offset profile includes a plurality of lateral offset values respectively representing direction and distance of offsets from the initial travel path at respective points along the initial travel path;
            determining whether at least one of the initial travel path, the offset profile, or the velocity profile meet one or more flatness criteria; and
            in response to determining that at least one of the initial travel path, the offset profile, or the velocity profile meet the one or more flatness criteria, combining the initial travel path, the offset profile, and the velocity profile into the respective trajectory;
        determining a trajectory from the plurality of trajectories; and
        controlling motion of the autonomous vehicle based, at least in part, on the determined trajectory.

20. An autonomous vehicle, comprising:
    one or more processors; and
    one or more non-transitory computer-readable media that store instructions that, when executed by the one or more processors, cause the one or more processors to perform operations, the operations comprising:
        obtaining an initial travel path for an autonomous vehicle from a first location to a second location;
        obtaining sensor data describing one or more objects within an environment of the autonomous vehicle, wherein the one or more objects are positioned along the initial travel path;
        generating a basis path from a current location of the autonomous vehicle to a point along the initial travel path;
        generating a plurality of trajectories for the autonomous vehicle based, at least in part, on the sensor data and the basis path, wherein generating a respective trajectory comprises:
            determining a velocity profile for the autonomous vehicle;
            determining an offset profile for the autonomous vehicle, wherein the offset profile includes a plurality of lateral offset values respectively representing direction and distance of offsets from the basis path at respective points along the basis path;
            determining whether at least one of the basis path, the offset profile, or the velocity profile meet one or more flatness criteria; and
            in response to determining that at least one of the basis path, the offset profile, or the velocity profile meet the one or more flatness criteria, combining the basis path, the offset profile, and the velocity profile into the respective trajectory;
        determining a trajectory from the plurality of trajectories; and
        controlling motion of the autonomous vehicle based, at least in part, on the determined trajectory.

21. The computer-implemented method of claim 1, wherein determining whether at least one of the initial travel path, the offset profile, or the velocity profile meet one or more flatness criteria comprises determining whether the initial travel path, the offset profile, and the velocity profile each meet the one or more flatness criteria.

* * * * *